United States Patent
Helitzer et al.

(10) Patent No.: US 10,354,328 B2
(45) Date of Patent: Jul. 16, 2019

(54) SYSTEM FOR PROCESSING REMOTE SENSOR DATA

(71) Applicant: Hartford Fire Insurance Company, Hartford, CT (US)

(72) Inventors: Jonathan Helitzer, Simsbury, CT (US); G. Stewart Murchie, West Hartford, CT (US); Kelly L. Frey, Nashville, TN (US); Casey Ellen Campbell, Rocky Hill, CT (US); Joseph R. Carvalko, Jr., Milford, CT (US)

(73) Assignee: Hartford Fire Insurance Company, Hartford, CT (US)

( * ) Notice: Subject to any disclaimer, the term of this patent is extended or adjusted under 35 U.S.C. 154(b) by 26 days.

(21) Appl. No.: 14/138,819

(22) Filed: Dec. 23, 2013

(65) Prior Publication Data

US 2014/0114693 A1 Apr. 24, 2014

Related U.S. Application Data

(63) Continuation of application No. 13/617,326, filed on Sep. 14, 2012, now Pat. No. 8,676,612, which is a (Continued)

(51) Int. Cl.
G06Q 40/08 (2012.01)
(52) U.S. Cl.
CPC .................................. *G06Q 40/08* (2013.01)
(58) Field of Classification Search
CPC ..... G06Q 40/08; G06Q 10/0635; G06Q 40/00
(Continued)

(56) References Cited

U.S. PATENT DOCUMENTS 4,667,336 A 5/1987 Best
4,975,840 A 12/1990 DeTore et al.
(Continued)

FOREIGN PATENT DOCUMENTS

EP 0155779 A1 9/1985
EP 1160707 A1 12/2001
(Continued)

OTHER PUBLICATIONS

Marley, Sara, "Deterring today's sophisticated criminals: Advances in security technology keep pace with demand," Business Insurance: 3. Crain Communications, Inc., May 18, 1992 (Year: 1992).*
(Continued)

*Primary Examiner* — Elaine Gort
*Assistant Examiner* — John P Go
(74) *Attorney, Agent, or Firm* — Howard IP Law Group

(57) ABSTRACT

A method and computerized system is disclosed for managing the underwriting, quoting and binding an insurance policy with regard to the technology used to militate against the financial consequences of property losses. The invention utilizes a classifier for categorizing and weighing risk, composed of data representing in an identified building, a first unmitigated insurance risk and a second insurance risk, based upon the use of certain technology. A plurality of such weights are summed such that the weights generate a minimized risk for a building structure under consideration. combinations of technologies, employed in existing building structures to a classification, which then permits an underwriter to establish a premium. In another aspect of the invention data structures representing the quantification of risk reduction attendant a given technology or product are chained into a plurality of decision trees that process a construction phase and a pruning phase.

16 Claims, 8 Drawing Sheets

Related U.S. Application Data continuation of application No. 12/709,117, filed on Feb. 19, 2010, now Pat. No. 8,271,303, which is a continuation of application No. 10/656,479, filed on Sep. 4, 2003, now Pat. No. 7,711,584.

(58) Field of Classification Search
USPC .......................................................... 705/4
See application file for complete search history.

(56) References Cited

U.S. PATENT DOCUMENTS

| | | |
|---|---|---|
| 5,613,072 A | 3/1997 | Hammond et al. |
| 5,635,693 A | 6/1997 | Benson et al. |
| 5,680,329 A | 10/1997 | Lloyd et al. |
| 5,712,984 A | 1/1998 | Hammond et al. |
| 5,794,216 A | 8/1998 | Brown |
| 5,796,932 A | 8/1998 | Fox et al. |
| 5,797,134 A | 8/1998 | McMillan et al. |
| 5,825,283 A | 10/1998 | Camhi |
| 5,842,148 A | 11/1998 | Prendergast et al. |
| 5,926,800 A | 7/1999 | Baronowski et al. |
| 5,950,150 A * | 9/1999 | Lloyd ............. A62C 37/50 340/506 |
| 5,970,464 A | 10/1999 | Apte et al. |
| 6,014,632 A | 1/2000 | Gamble et al. |
| 6,064,970 A | 5/2000 | McMillan et al. |
| 6,067,488 A | 5/2000 | Tano |
| 6,078,857 A | 6/2000 | Jung et al. |
| 6,112,225 A | 8/2000 | Kraft et al. |
| 6,154,658 A | 11/2000 | Caci |
| 6,163,277 A | 12/2000 | Gehlot |
| 6,163,770 A | 12/2000 | Gamble et al. |
| 6,182,048 B1 | 1/2001 | Osborn et al. |
| 6,204,757 B1 | 3/2001 | Evans et al. |
| 6,211,777 B1 | 4/2001 | Greenwood et al. |
| 6,223,125 B1 | 4/2001 | Hall |
| 6,246,934 B1 | 6/2001 | Otake et al. |
| 6,307,965 B1 | 10/2001 | Aggarwal et al. |
| 6,389,340 B1 | 5/2002 | Rayner |
| 6,502,020 B2 | 12/2002 | Lang |
| 6,563,423 B2 | 5/2003 | Smith |
| 6,583,734 B2 | 6/2003 | Bates et al. |
| 6,594,579 B1 | 7/2003 | Lowrey et al. |
| 6,611,740 B2 | 8/2003 | Lowrey et al. |
| 6,633,820 B2 | 10/2003 | Bizar |
| 6,636,790 B1 | 10/2003 | Lightner et al. |
| 6,643,578 B2 | 11/2003 | Levine |
| 6,684,189 B1 | 1/2004 | Ryan et al. |
| 6,710,738 B2 | 3/2004 | Allen, Jr. |
| 6,732,031 B1 | 5/2004 | Lightner et al. |
| 6,735,525 B1 | 5/2004 | Murphy |
| 6,754,485 B1 | 6/2004 | Obradovich et al. |
| 6,756,915 B2 | 6/2004 | Choi |
| 6,767,330 B2 | 7/2004 | Lavery et al. |
| 6,768,417 B2 | 7/2004 | Kuragaki et al. |
| 6,795,759 B2 | 9/2004 | Doyle |
| 6,823,258 B2 | 11/2004 | Ukai et al. |
| 6,832,141 B2 | 12/2004 | Skeen et al. |
| 6,839,305 B2 | 1/2005 | Perlman et al. |
| 6,853,956 B2 | 2/2005 | Ballard, Jr. et al. |
| 6,868,339 B2 | 3/2005 | Murphy et al. |
| 6,868,386 B1 | 3/2005 | Henderson et al. |
| 6,871,199 B1 | 3/2005 | Binnig et al. |
| 6,920,379 B2 | 7/2005 | Miyamoto |
| 6,925,425 B2 | 8/2005 | Remboski et al. |
| 6,931,309 B2 | 8/2005 | Phelan et al. |
| 6,957,133 B1 | 10/2005 | Hunt et al. |
| 6,965,326 B2 | 11/2005 | Allison |
| 6,968,453 B2 | 11/2005 | Doyle et al. |
| 6,973,319 B2 | 12/2005 | Ormson |
| 6,977,612 B1 | 12/2005 | Bennett |
| 6,985,922 B1 | 1/2006 | Bashen et al. |
| 6,987,964 B2 | 1/2006 | Obradovich et al. |
| 7,017,142 B1 | 3/2006 | Ehnebuske et al. |
| 7,039,592 B1 | 5/2006 | Yegge et al. |
| 7,069,118 B2 | 6/2006 | Coletrane et al. |
| 7,072,841 B1 | 7/2006 | Pednault |
| 7,114,376 B2 | 10/2006 | Loucks et al. |
| 7,215,255 B2 | 5/2007 | Grush |
| 2001/0004202 A1 | 6/2001 | Park |
| 2001/0039509 A1 | 11/2001 | Dar et al. |
| 2001/0042024 A1 | 11/2001 | Rogers |
| 2001/0044733 A1 | 11/2001 | Lee et al. |
| 2002/0002475 A1 | 1/2002 | Freedman et al. |
| 2002/0010601 A1 | 1/2002 | Taylor |
| 2002/0013717 A1 | 1/2002 | Ando et al. |
| 2002/0052765 A1 | 5/2002 | Taylor |
| 2002/0072958 A1 | 6/2002 | Yuyama et al. |
| 2002/0087364 A1 | 7/2002 | Lerner et al. |
| 2002/0091550 A1 | 7/2002 | White et al. |
| 2002/0099596 A1 | 7/2002 | Geraghty |
| 2002/0103622 A1 | 8/2002 | Burge |
| 2002/0115423 A1 | 8/2002 | Hatae et al. |
| 2002/0128882 A1 | 9/2002 | Nakagawa et al. |
| 2002/0147617 A1 | 10/2002 | Schoenbaum et al. |
| 2002/0161609 A1 | 10/2002 | Zizzamia et al. |
| 2002/0165739 A1 | 11/2002 | Guyan et al. |
| 2002/0173885 A1 | 11/2002 | Lowrey et al. |
| 2002/0178033 A1 | 11/2002 | Yoshioka et al. |
| 2002/0194033 A1 | 12/2002 | Huff |
| 2002/0194113 A1 | 12/2002 | Lof et al. |
| 2002/0198801 A1 | 12/2002 | Dixon et al. |
| 2003/0004093 A1 | 1/2003 | Piazza et al. |
| 2003/0009357 A1 | 1/2003 | Pish |
| 2003/0028406 A1 | 2/2003 | Herz et al. |
| 2003/0040934 A1 | 2/2003 | Skidmore et al. |
| 2003/0061075 A1 | 3/2003 | Heckman et al. |
| 2003/0093366 A1 | 5/2003 | Halper et al. |
| 2003/0101080 A1 | 5/2003 | Zizzamia et al. |
| 2003/0105651 A1 | 6/2003 | Gendelman |
| 2003/0135395 A1 | 7/2003 | Carfi et al. |
| 2003/0154009 A1 | 8/2003 | Basir et al. |
| 2003/0158758 A1 | 8/2003 | Kanazawa et al. |
| 2003/0171956 A1 | 9/2003 | Cox et al. |
| 2003/0187702 A1 | 10/2003 | Bonissone et al. |
| 2003/0187704 A1 | 10/2003 | Hashiguchi et al. |
| 2003/0221118 A1 | 11/2003 | Walker |
| 2003/0229522 A1 | 12/2003 | Thompson et al. |
| 2003/0233261 A1 | 12/2003 | Kawahara et al. |
| 2003/0233278 A1 | 12/2003 | Marshall |
| 2003/0233323 A1 | 12/2003 | Bilski et al. |
| 2004/0036601 A1 | 2/2004 | Obradovich |
| 2004/0039586 A1 | 2/2004 | Garvey et al. |
| 2004/0102172 A1 | 5/2004 | Hendin |
| 2004/0103002 A1 | 5/2004 | Colley et al. |
| 2004/0117217 A1 | 6/2004 | Reber et al. |
| 2004/0138927 A1 | 7/2004 | Eydeland et al. |
| 2004/0139034 A1 * | 7/2004 | Farmer ............. G06Q 30/0283 705/400 |
| 2004/0148201 A1 | 7/2004 | Smith et al. |
| 2004/0153762 A1 | 8/2004 | Flynn et al. |
| 2004/0181495 A1 | 9/2004 | Grush |
| 2004/0186753 A1 | 9/2004 | Kim et al. |
| 2004/0199410 A1 | 10/2004 | Feyen et al. |
| 2004/0215494 A1 | 10/2004 | Wahlbin et al. |
| 2004/0220784 A1 | 11/2004 | Stephenson et al. |
| 2004/0220837 A1 | 11/2004 | Bonissone et al. |
| 2004/0220838 A1 | 11/2004 | Bonissone et al. |
| 2004/0220839 A1 | 11/2004 | Bonissone et al. |
| 2004/0220840 A1 | 11/2004 | Bonissone et al. |
| 2004/0225535 A1 | 11/2004 | Bond, Jr. et al. |
| 2004/0236596 A1 | 11/2004 | Chowdhary et al. |
| 2004/0236611 A1 | 11/2004 | Bonissone et al. |
| 2004/0236676 A1 | 11/2004 | Takezawa et al. |
| 2004/0243450 A1 | 12/2004 | Bernard, Jr. et al. |
| 2004/0249557 A1 | 12/2004 | Harrington et al. |
| 2004/0249679 A1 | 12/2004 | Henderson et al. |
| 2004/0260579 A1 | 12/2004 | Tremiti |
| 2004/0267577 A1 | 12/2004 | Nakai |
| 2005/0021360 A1 | 1/2005 | Miller et al. |
| 2005/0038682 A1 | 2/2005 | Gandee et al. |
| 2005/0055248 A1 | 3/2005 | Helitzer et al. |
| 2005/0055249 A1 | 3/2005 | Helitzer et al. |
| 2005/0060141 A1 | 3/2005 | Suzuki et al. |

(56) References Cited

U.S. PATENT DOCUMENTS

| | | |
|---|---|---|
| 2005/0060207 A1 | 3/2005 | Weidner et al. |
| 2005/0070299 A1 | 3/2005 | Caspi et al. |
| 2005/0071202 A1 | 3/2005 | Kendrick |
| 2005/0075067 A1 | 4/2005 | Lawson et al. |
| 2005/0086084 A1 | 4/2005 | Dillard |
| 2005/0091085 A1 | 4/2005 | Colley et al. |
| 2005/0091175 A9 | 4/2005 | Farmer |
| 2005/0102172 A1 | 5/2005 | Sirmans, Jr. |
| 2005/0108063 A1 | 5/2005 | Madill, Jr. et al. |
| 2005/0108065 A1 | 5/2005 | Dorfstatter |
| 2005/0108066 A1 | 5/2005 | Weidner et al. |
| 2005/0125259 A1 | 6/2005 | Annappindi |
| 2005/0131742 A1 | 6/2005 | Hoffman et al. |
| 2005/0137912 A1 | 6/2005 | Rao et al. |
| 2005/0171885 A1 | 8/2005 | Christman et al. |
| 2005/0174217 A1 | 8/2005 | Basir et al. |
| 2005/0192730 A1 | 9/2005 | Churchill et al. |
| 2005/0216583 A1 | 9/2005 | Cole et al. |
| 2005/0222867 A1 | 10/2005 | Underwood et al. |
| 2005/0228692 A1 | 10/2005 | Hodgdon |
| 2005/0234742 A1 | 10/2005 | Hodgdon |
| 2005/0276401 A1 | 12/2005 | Madill, Jr. et al. |
| 2005/0278082 A1 | 12/2005 | Weekes |
| 2005/0285748 A1 | 12/2005 | Pedraza et al. |
| 2006/0000420 A1 | 1/2006 | Martin Davies |
| 2006/0009289 A1 | 1/2006 | McCarten et al. |
| 2006/0015253 A1 | 1/2006 | Ochs et al. |
| 2006/0015360 A1 | 1/2006 | Ochs et al. |
| 2006/0015373 A1 | 1/2006 | Cuypers |
| 2006/0015374 A1 | 1/2006 | Ochs et al. |
| 2006/0036473 A1 | 2/2006 | Taylor |
| 2006/0053038 A1 | 3/2006 | Warren et al. |
| 2006/0064332 A1 | 3/2006 | Schoenbaum et al. |
| 2006/0136273 A1 | 6/2006 | Zizzamia et al. |
| 2006/0187889 A1 | 8/2006 | Mehta et al. |
| 2006/0242046 A1 | 10/2006 | Haggerty et al. |
| 2006/0259333 A1 | 11/2006 | Pyburn et al. |
| 2006/0287892 A1 | 12/2006 | Jones et al. |
| 2007/0016500 A1 | 1/2007 | Chatterji et al. |
| 2007/0016508 A1 | 1/2007 | Lapointe et al. |
| 2007/0021987 A1 | 1/2007 | Binns et al. |
| 2007/0027726 A1 | 2/2007 | Warren et al. |
| 2007/0043656 A1 | 2/2007 | Lancaster |
| 2007/0043662 A1 | 2/2007 | Lancaster |
| 2007/0106539 A1 | 5/2007 | Gay |

FOREIGN PATENT DOCUMENTS

| | | | |
|---|---|---|---|
| EP | 1241599 A1 | 9/2002 | |
| EP | 1145163 B1 | 5/2003 | |
| EP | 1313043 A1 | 5/2003 | |
| EP | 1544771 A1 | 6/2005 | |
| EP | 1583013 A1 | 10/2005 | |
| JP | 2001118175 A | 4/2001 | |
| JP | 2001319051 A | 11/2001 | |
| JP | 2002092764 A | 3/2002 | |
| JP | 2002109229 A | 4/2002 | |
| JP | 2002133117 A | 5/2002 | |
| JP | 2002183456 A | 6/2002 | |
| JP | 2002329071 A | 11/2002 | |
| JP | 2002373259 A | 12/2002 | |
| JP | 2004013234 A | 1/2004 | |
| JP | 2004017901 A | 1/2004 | |
| JP | 2004059013 A | 2/2004 | |
| JP | 2004078393 A | 3/2004 | |
| JP | 2004240688 A | 8/2004 | |
| WO | 9921116 A1 | 4/1999 | |
| WO | 0111501 A1 | 2/2001 | |
| WO | 0163445 A2 | 8/2001 | |
| WO | 0163534 A2 | 8/2001 | |
| WO | 03058381 A2 | 7/2003 | |
| WO | 03065268 A1 | 8/2003 | |
| WO | 03090130 A1 | 10/2003 | |
| WO | WO-2004027677 A1 * | 4/2004 | ............... E02D 1/02 |
| WO | 2004100043 A1 | 11/2004 | |

OTHER PUBLICATIONS

Vickrey, William. Automobile Accidents, Tort Law, Externalities, and Insurance: An Economists Critique. Orig. pub. in Law and Contemporary Problems, 33:464-87 (1968).

Wang, Wei. Thesis. Predictive Modeling Based on Classification and Pattern Matching Methods. (May 1999). 134 pages.

Wenzel, T. Analysis of National Pay-As-You-Drive Insurance Systems and Other Variable Driving Charges. Lawrence Berkeley Lab., Univ. of Calif. (Jul. 1995). 75 pages.

Werner et al. GLM Basic Modeling: Avoiding Common Pitfalls. Casualty Actuarial Society Forum. pp. 257-272. (Winter 2007).

Wolak, Dan. An Actuarial Response to the Health-Care Crisis. Society of Actuaries. Issue 47, 1-9. (Apr. 2004).

Woodfield, Terry J. Paper 13-26. Predictive Modeling in the Insurance Industry Using SAS Software. (2001). 5 pages.

Woodfield, Terry J. Paper 071-30. Predicting Workers' Compensation Insurance Fraud Using SAS Enterprise Miner 5.1 and SAS Text Miner. 2004. 6 pages.

Woodley et al. Assessing Predictive Modeling Tools for Pricing and Underwriting. Health Watch. Issue 51, pp. 30-33. (Jan. 2006).

Wu et al. Paper. Does Credit Score Really Explain Insurance Losses? Multivariate Analysis from a Data Mining Point of View. Casualty Actuarial Society Forum. 2003. pp. 113-138.

Wu, Cheng-sheng Peter et al. A View Inside the "Black Box:" A Review and Analysis of Personal Lines Insurance Credit Scoring Models Filed in the State of Virginia. Casualty Actuarial Society Forum, pp. 251-290 (Winter 2004).

Young, Virginia R. Robust Bayesian Credibility Using Semiparametric Models. ASTIN Bulletin, vol. 28, No. 1 1998, pp. 197-203.

Antonio et al. North American Actuarial Journal. 10:1, 30-48. Lognormal Mixed Models for Reported Claims Reserves. (Jan. 2006).

German, J. Portable structure tester may bring better-built homes, shopping malls, skyscrapers. Sandia Lab News. 51:2. Jan. 29, 1999., 4 pages.

Apte, C.; et al., Business applications of data mining, Data Abstraction Res, Group, IBM T. J. Watson Res. Center,; Yorktown Heights, NY, USA, Communications of the CAM, vol. 45, No. 8, Publisher: ACM, Aug. 2002, 49-53.

Apte, C.; et al., Insurance Risk Modeling Using Data Mining Technology, IBM Thomas J. Watson Res. Center, Yorktown Heights, NY, USA, Conference: PADD99. Proceedings of the Third International Conference on the Practical Application of Knowledge Discovery and Data Mining, Publisher: Practical Application Company, Blackpool, UK, 1999, 209 Pages.

The Lowdown Ways to Reduce the Premium on Homeowner's Insurance; [Chicago Sports Final Edition] Diana McCabe, Knight Ridder/Tribune. Chicago Tribune. Chicago, IL: Aug. 25, 2000. p. 28.

AIG Auto Insurance Launches GPS Based Teen Driver Pilot Program. (Apr. 9, 2007), 1 page.

Apte et al. Data-intensive analytics for predictive modeling. IBM Journal of Research and Development. 47:1, 17-23 (Jan. 2003).

Apte et al. A probabilistic estimation framework for predictive modeling analytics. IBM Systems Journal. 41:3, 438-48. (2002).

Axelrod et al. Predictive Modeling in Health Plans. Abstract from Disease Management & Health Outcomes, 11:779-87 (9). (Nov. 2003).

Butler et al. Driver Record: A Political Red Herring That Reveals the Basic Flaw in Automobile Insurance Pricinq. J. of Insurance Regulation. 8:2, 200-234 (1989).

CAS Data Management and Information Educational Materials Working Party. Survey of Data Management and Data Quality Texts. Casualty Actuarial Society Forum, pp. 273-306. (Winter 2007).

Chittim, G. Insure as you drive. KING5 News for Seattle. (Mar. 27, 2007). 2 pages.

Conger et al. Emphasis Apr. 2006. Predictive Modeling in Workers Compensation. pp. 18-21. (2006).

(56) References Cited

OTHER PUBLICATIONS

D'Arcy, Stephen P. Predictive Modeling in Automobile Insurance: A Preliminary Analysis. Paper presented at World Risk and Insurance Economics Congress. Aug. 2005. 33 pages.
De Alba, Enrique. Bayesian Estimation of Outstanding Claims Reserves. No. Ameri. Actuarial J. 6:4, 1-20. (2002).
Deloitte & Touche. Advanced analytics and the art of underwriting: Transforming the insurance industry. At least as early as Sep. 3, 2003. 12 pages.
Derrig et al. Comparison of Methods and Software for Modeling Nonlinear Dependencies: A Fraud Application. (2006). 25 pages.
Dorn, et al., "Insurance Industry Databases : Bases de donnees dans le domaine de l'assurance," American International Group, Inc., United States, Database: (Weston), vol. 21, No. 5, 1998 pp. 68-71.
Ellingsworth et al. DM Review. Text Mining Improves Business Intelligence and Predictive Modeling in Insurance. (Jul. 2003). 5 pages.
Ellis et al. Applying Diagnosis-Based Predictive Models to Group Underwriting. Society of Actuaries, Issue 46, 1-7. (Aug. 2003).
Fellingham et al. Comparing Credibility Estimates of Health Insurance Claims Costs. No. Ameri. Actuarial J. 9:1, 1-12. (2005).
Fetterolf, Don. Paradise Lost: Return on Investment in Disease Management. Health Watch. Issue 52, pp. 14-17. (May 2006).
Francis Analytics and Actuarial Data Mining. Predictive Modeling Workshop presentation: Training for development and deployment. At least as early as Sep. 3, 2003, 13 pages.
Gallagher, Cecily, "Risk Classification Aided by New Software Tool", National Underwriter Property &Casualty Risk Benefits and Management,No. 17, Apr. 27, 1992, 19.
Grimes, Seth. The Word on Text Mining. Presentation. Portals, Collaboration, and Content Management. (Apr. 14, 2005). 32 pages.
Guszcza et al. Predictive Modeling for Property—Casualty Insurance. Presentation to SoCal Actuarial Club. (Sep. 22, 2004). 40 pages.
Guven, Serhat. Predictive Modeling. Future Fellows. (Jun. 2006). 3 pages.
Hong, S.J. et al. IBM Research Report RC-21570. Advances in Predictive Model Generation for Data Mining. (1999). 18 pages.
Insurance Newscast Press Release. "Predictive Modeling Raises Opportunities and Issues for Actuaries and Insurers, CAS Meeting is Told." (Dec. 15, 2005). 2 pages.
Johnston, J. Vehicle's Black Box Holds Key to Crash (May 21, 2003). 4 pages.
Litman, T. Distance-Based Vehicle Insurance Feasibility, Costs and Benefits. Comprehensive Technical Report). Victoria Transport Policy Institute. (Jul. 8, 2004). 126 pages.
Macleod et al. Paper. Entropy-Reducing Properties of Predictive Financial Models. Aug. 27, 1992. Actuarial Research Clearing House. vol. 3 (1993). pp. 205-229.
Magnify Press Release. Magnify Applies Predictive Modeling to Worker's Comp Underwriting and Fraud Detection. Chicago, IL (Mar. 1, 2005). 2 pages.
Magnify Press Release. Erie Insurance Reduces Fraud Losses with FraudFocus. Predictive Modeling Demonstrates Effectiveness for Auto, Property and Worker's Comp, (Feb. 4, 2005). 2 pages.
Meyers, Glenn. On Predictive Modeling for Claim Severity. Casualty Actuarial Society Forum. pp. 215-253. (Spring 2005).
Morgan et al. Conjugate Bayesian Analysis of the Negative Binomial Distribution. Actuarial Research Clearing House. vol. 1, pp. 97-118, (1993).
Mosley, R. The Use of Predictive Modeling in the Insurance Industry. Pinnacle Actuarial Resources Inc. (Jan. 2005). 4 pages.
Muller, Stacey. Predictive Modeling: Using Claims Data to Find Trends and Cost Drivers. Milliman Consultant's Corner. At least as early as Sep. 4, 2003. 3 pages.
Nerad, Jack. Insurance by the mile. (1212212004) Dec. 22, 2004. 2 pages.
Pednault et al. IBM Research Report RC-21731. Handling Imbalanced Data Sets in Insurance Risk Modeling. (Mar. 10, 2000). 6 pages.
Pednault et al. IBM Research Report RC-21757. The Importance of Estimation Errors in Cost-Sensitive Learning. (May 30, 2000). 7 pages.
Weyuker, L. et al. Predictive Modeling Applications. , Record, 31:2. New Orleans Health/Pension Spring Meeting, Session 3PD. (Jun. 2005). 17 pages.
Predictive Modeling-Current Practices and Future Applications. Record, 30:1. Spring Meeting, Anaheim, CA. Session 64PD. (May 2004). 20 pages.
Predictive Modeling. Record, 28:2. Spring Meeting, San Francisco, CA. Session 99OF. (Jun. 2002). 20 pages.
Riegel et al. Insurance Principles and Practices, Prentice-Hall, Inc. pp. i-xi (1921).
Roberts, Gregory. Seattle Post-Intelligencer. Drive less during rush hour, get a lower insurance rate. (Mar. 27, 2007). 1 page.
Rosella Data Mining & Database Analytics. Downloaded from www.roselladb.com/insurance-risk-analysis.htm. At least as early as Sep. 3, 2003. 6 pages.
Rosella Data Mining & Predictive Analytics. Predicting Modeling Software. Downloaded from www.roselladb.com/predictive-modeling. htm. At least as early as Sep. 3, 2003. 5 pages.
Rosenberg et al. Predictive Modeling with Longitudinal Data: A Case Study of Wisconsin Nursing Homes. School of Business, University of Wisconsin (Feb. 4, 2006). 21 pages.
Roudebush et al. Converting Clinical Literature to an Insured Population: A Comparison of Models Using NHANES. No. Ameri. Actuarial J. 6:4, 55-66. (2002).
Sanche et al. Variable Reduction for Predictive Modeling with Clustering. Casualty Actuarial Society Forum, pp. 89-100. (Winter 2006).
Sharp, Keith P. Aspects of Interest Rate Models. Actuarial Research Clearing House. vol. 1, pp. 433-457. (Aug. 25, 1990).
Steed, Judy. Winning Ways. Toronto Star, p. 3-4 (May 21, 2007).
Stehno, Chris E. What We Have Learned in the Last 50 Years—and Aren't Using. Health Watch. Issue 52, pp. 18-21. (May 2006).
Table of Contents of White Paper. Predictive Modeling in Insurance: An insurance industry executive briefing. SAS (Predictive Modeling in Insurance), publisher. (Mar. 23, 2007). 2 pages.

\* cited by examiner

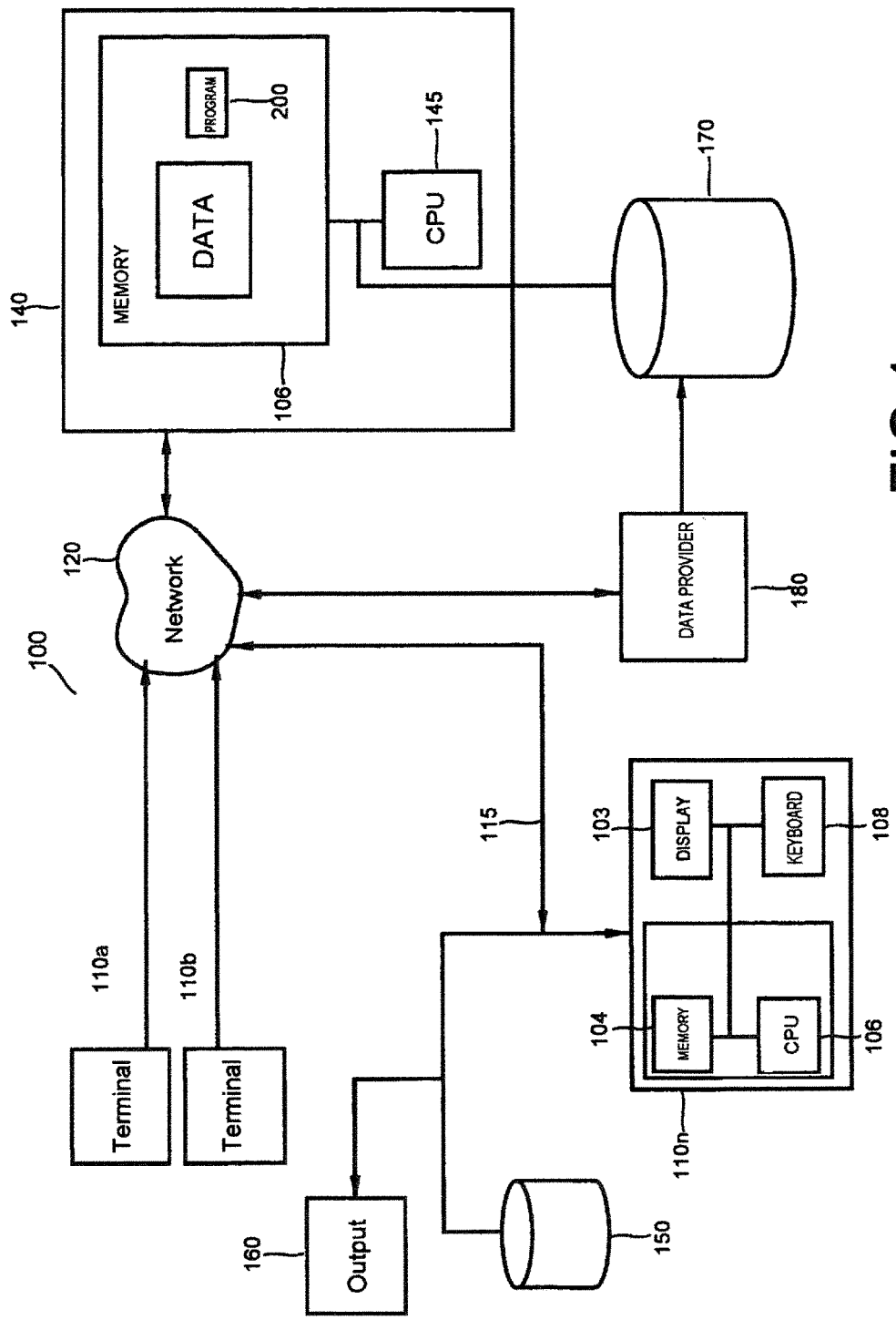

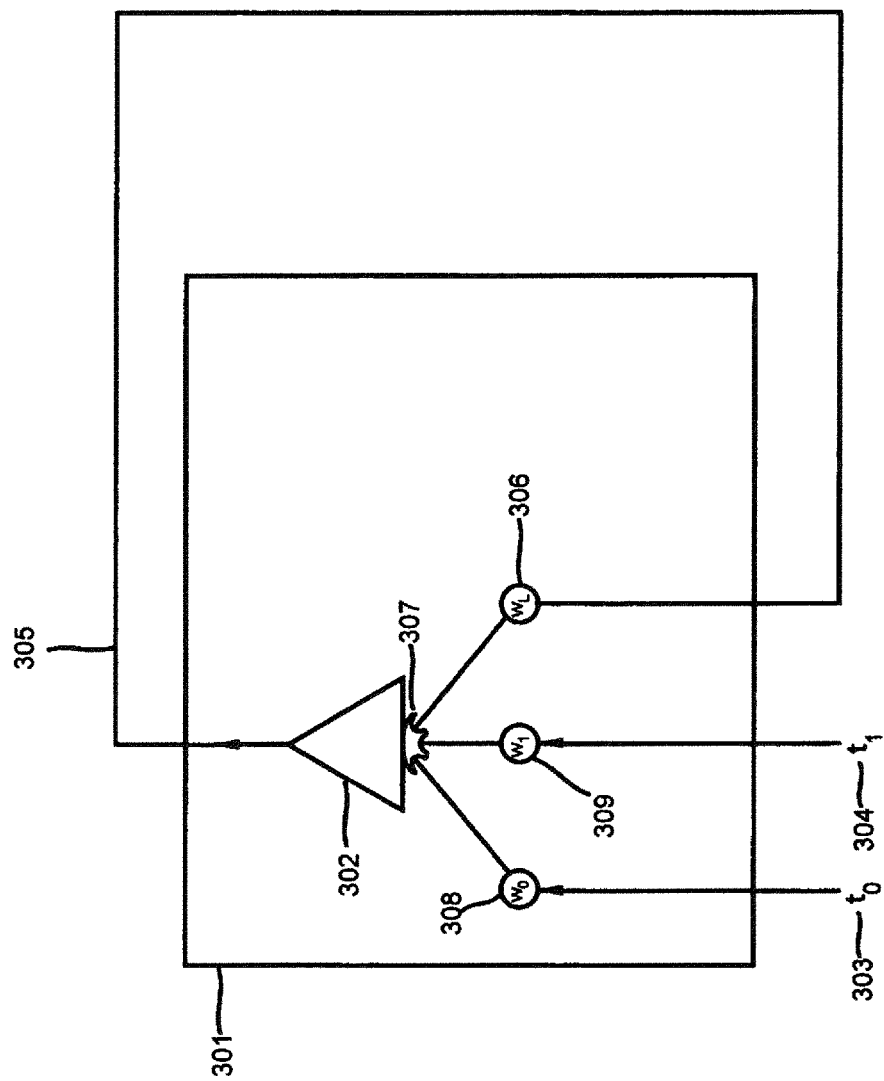

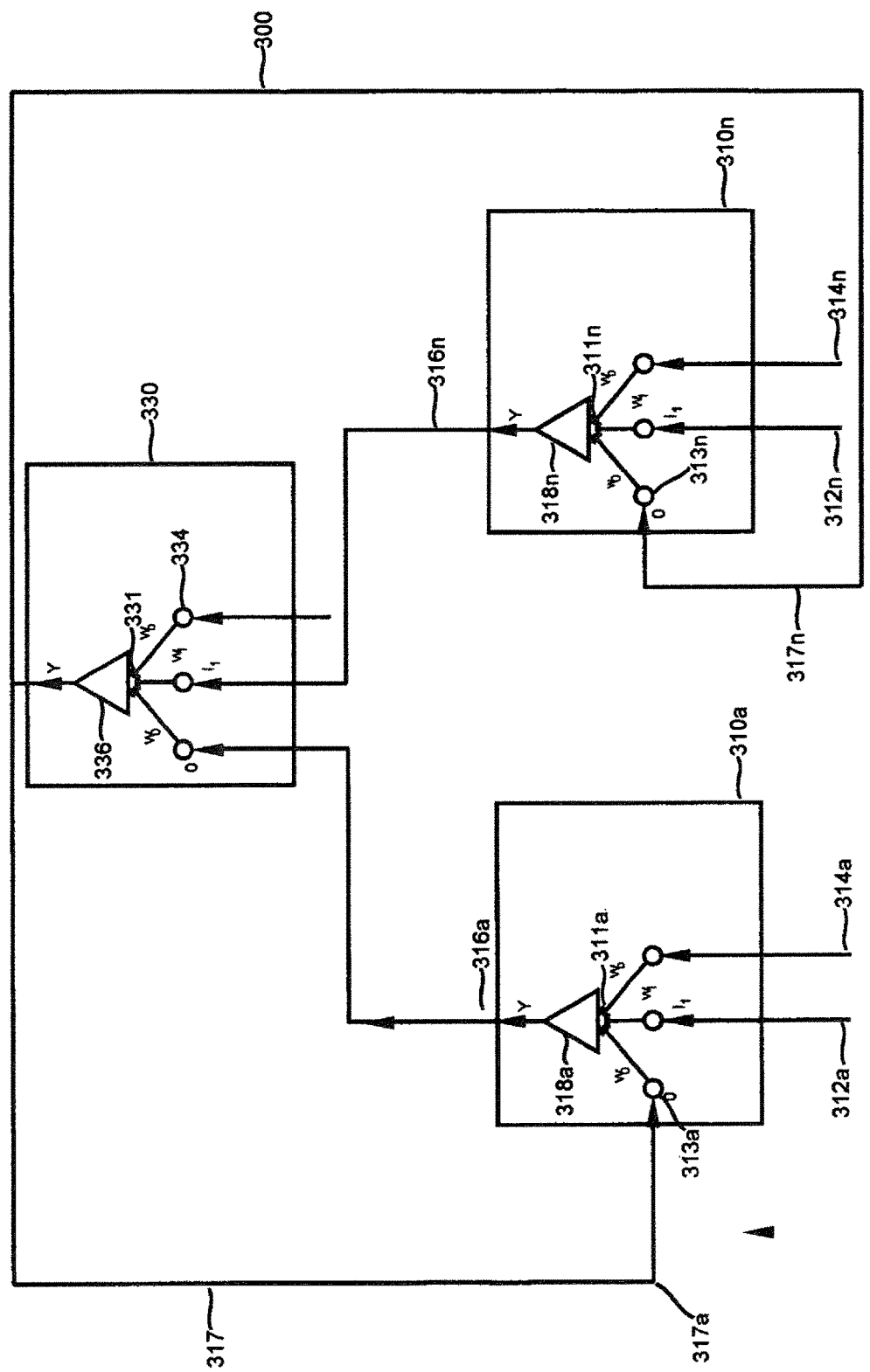

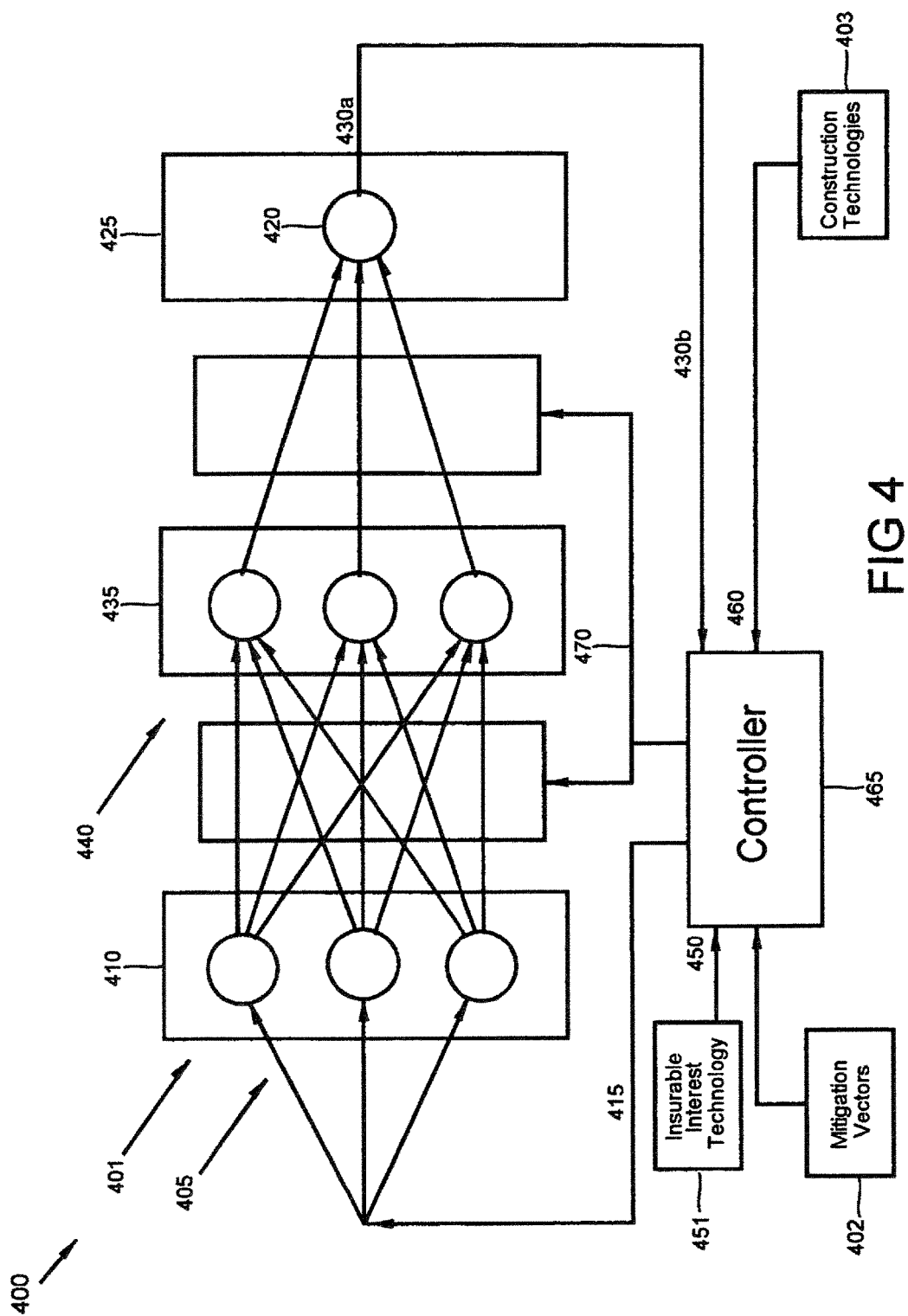

SYSTEM FOR PROCESSING REMOTE SENSOR DATA

CROSS-REFERENCE TO RELATED APPLICATIONS

This is a continuation application of and claims priority to copending U.S. patent application Ser. No. 13/617,326, filed Sep. 14, 2012, which is a continuation application of and claims priority to U.S. patent application Ser. No. 12/709,117, filed Feb. 19, 2010, now U.S. Pat. No. 8,271,303, which is a continuation application of and claims priority to U.S. patent application Ser. No. 10/656,479, filed Sep. 4, 2003, now U.S. Pat. No. 7,711,584, the entirety of each of the foregoing applications being hereby incorporated by reference herein for all purposes.

BACKGROUND OF THE INVENTION

1. Field of the Invention

This invention relates to a method and computerized system for creating, publishing, underwriting, selling and managing insurance products, the issuance criteria and premium, for which, is based upon the technology utilized in connection with the insurable interest.

2. Description of the Prior Art

Underwriting is the process of establishing insurability and premium levels that will economically and profitably transfer risk from a policyholder to an insurance company. In determining insurability and premium, insurance carriers take into account such factors as profit goals, competition, legal restrictions and the costs associated with losses (claims costs), loss adjustment expenses (claim settlements), operational expenses (commission and brokerage fees), general administrative expenses, and the cost of capital.

More particularly, an insurance carrier typically assesses a unit of exposure on the basis of a premium, known and predicted exposure, and loss and expense experience. In this manner carriers establish the basis of potential loss and the general direction of trends in insurance claim costs. In setting and subsequently adjusting which risks to underwrite and the premium a carrier catalogs by time and place, accidents as well as changes in claim costs, claim frequencies, loss exposures, expenses and premiums; the impact of catastrophes on the premium rates; the effect of salvage and subrogation, coinsurance, coverage limits, deductibles, coverage limitations or type of risks that may affect the frequency or severity of claims; changes in the underwriting process, claims handling, case reserves and marketing practices that affect the experience; impact of external influences on the future experience, including the judicial environment, regulatory and legislative changes, fund availability, and the modifications that reflect the impact of individual risk rating plans on the overall experience. However, notably absent from the factors customarily taken into account and one of the most profound influences in loss experience is the effect of technology. Therefore, an underwriting process that considers the continuing technology revolution would be anticipated to better assess loss ratios for insurable interests.

It is widely assumed that using various technologies may reduce the risks of loss associated with building structures, generally. Consequently, state, local and national construction codes affecting such things as structural requirements, electrical standards, plumbing and paint are constantly being advanced. For example, home building codes throughout the United States have placed a minimum standard on requirements for construction to assure a minimally safe habitation and structural integrity under typical local conditions for geologic and meteorological occurrences. Beyond the requirements imposed through legal regulation, property owners may also employ systems that further militate against one or another loss or hazard. For well over a generation, home security systems have been utilized to reduce losses from dwelling break-ins. Many fire alarm systems automatically call fire stations minimizing fire damage and reducing human loss through early detection and central alarm at the appropriate responder location. In addition to fire notification, flame-retardants are in wide use to reduce damage from fire. In some instances one technology replaces another as to improve a condition that is inherently dangerous, but the replacement technology retains the fundamental objective of reducing damage. For example, asbestos has been virtually banned as a building material in favor of flame retarding products as a means for reducing fire hazards. As new hazards are discovered, newer technology will be incorporated to achieve the benefits of a safer society.

From a baseline related to minimum code requirements, underwriters of property and casualty insurance factor into the risk/loss proposition items that relate to the structure to be insured (by way of example, the year of construction, type of construction, area, roof materials, egresses, the property's physical address, its proximity to fire apparatuses such as fire hydrants or fire stations, proximity to environmental hazards, such as superfund dumps, large bodies of water and its current market and replacement value). Underwriters also take into account items not directly related to the physical properties of the insurable interest, but that have been statistically shown to correlate with risk/loss (by way of example, the insured's credit rating, age of the property owners, and the insured's prior claim history).

Contemporary underwriting practice is typically reduced to a binary choice to issue or not to issue a policy of insurance based upon the aggregate of statistically relevant underwriting criteria, rather than producing insurance products tailored to combinations of risk reduction technology. As such, the benefits of a class of technology may not be adequately considered during the underwriting process. Significantly, the range of efficacies associated with specific technologies within a class of technologies are ignored as a salient fact.

A prime example might be an underwriting practice that does not factor in the functional details of available sensor technology such as by way of example, the type and corresponding unique features of the spectrum of smoke detectors, fire detectors, intrusion systems, radiation, chemical or biological hazard detectors (such as the detection of disease producing infectious agents, causing viral infections or the presence of allergens related to common allergies and forms of sinusitis). Other examples of sensing potential damaging situations are: water level or leakage detectors, vibration detectors, and meteorological conditions.

Also, the current insurance underwriting practice does not factor in details on various actively responsive technologies that are currently available such as by way of example, the type (i.e. specific functionality) of sprinkler system, the presence of a chemical release system to, for instance, release fungicides to kill mold spores or water pumping systems to remove damaging water or products that communicate medical emergencies. Nor does the current insurance underwriting practice discriminate between self-reports by the potential insured of extant technology and actual, continuous functionality (monitoring) of relevant technology designed to reduce damage/risks.

Products as familiar as the common home alarm system or security lighting, to the less common sensors attached to screens and windows, would be considered the kinds of products that are readily available by today's consumer. Overlooked however are the safety advantages of slip-less floor covering, outside walkways constructed from materials that insure against the accumulation of ice and snow and/or have high friction qualities due to the materials of constructions. However, in the future there will be a wide variety of products that detect and/or ameliorate all forms of hazards to property and health that will be available and utilized depending upon the value, as well as the incentives provided, such as through less expensive insurance premiums.

The insurance industry has long recognized the risk reduction concomitant to the incorporation of certain products in buildings. Certain products keep loss premium ratios down as well as providing a benefit to the property owners in terms of reduced property loss and improved health.

Thousands of separate and distinct materials and products are employed in the construction of homes and commercial buildings. Large numbers of such building products have a significant impact upon personal safety and the ability of the structure to withstand catastrophic events. Architects, builders and home owners have considerable opportunity to chose among diverse products that might for purposes of discussion be separated into categories such as building materials, sensor technologies and responder technologies. An exhaustive list of products from those categories, alone pertaining to loss prevention and mitigation could reasonably be expected to run into the millions of combination (e.g. more than 100 different materials times 100 different sensor technologies times 100 different responder technologies). Various specific combinations may have corresponding efficacies with regard to the amelioration of loss. In each instance, the consumer would anticipate a corresponding premium to reflect the expected loss ratios attendant to using a particular product or combination of products (and might be influenced to make more economically sound judgments in incorporating materials/technologies that reduce damage/risk, if the benefit of such choices could be clearly articulated in costs savings from reduced premiums over the life of the material/technology in question).

However, the insurance industry generally does not factor into its actuarial computations or underwriting rules the reduction in risk with sufficient specificity to affect premiums or expand coverage that can be underwritten within acceptable loss premium ratios (either by increasing specificity as to exclusions, qualifying risk allocation based upon risk reduction technology or providing extended coverage under excess premium conditions). Nor does the industry publish or otherwise make available to the consumer sufficient information on the underwriting process to allow the consumer to adequately select militating technology that could result in significant costs savings, both to the consumer and the insurance underwriter. In as much as classical underwriting depends to a large degree on statistics surrounding conditions relevant to loss, the difficulty in utilizing technologic innovation in the actuarial computations has to do with the small sample sizes and/or lack of data on the ameliorating effect of a particular technology.

As apparent, the salient combination of technologies utilized in a building may be vast, and searching for specific combinations and relating them to loss ratio and premiums is a time consuming process utilizing current information processing systems. Nonetheless, such systems may feasibly be handled with such technologies as neural networks as discussed in such patents as U.S. Pat. Nos. 5,696,907 and 5,893,072.

SUMMARY OF THE INVENTION

The invention herein disclosed deals with insurance products, systems and methods that treat the management of risk, relating to specified, yet unknown, future events. Insurance underwriters specify a particular product relating to an event or phenomenon for which there is a range of possible future outcomes. The related insurance company then offers an insurance contract relating to the predetermined phenomenon and corresponding range of outcomes based upon a range of efficacies of suitable technology within a class of technology. The offered contracts specify a requirement or an incentive to employ a particular technology to militate against loss entitlement and specify the maximum policies insurance limits with and without the militating technology at the future time a claim is made and a consideration or premium payable upon binding. Such invention may be expressed in terms of an underwriting system/process for determining issuance of insurance and calculation of premium for a single insurable interest or a system/process for calculation and presentation of multiple underwriting options/end-states based upon the use of a plurality of technologies incorporated into the insurable interest to militate against loss.

Expert computer systems, which may include decision trees, neural networks and statistical inference engines, have the ability to store information, interpret the information and draw inferences based upon the information such as received from sensors and descriptors of loss mitigation technology. The general architecture of an expert system involves a problem dependent set of data declarations called the knowledge base, and a problem independent program which is called the inference engine. The data collected from sensors or other quantifications of loss mitigation technology such as been described hereinabove can provide the information, from which data declarations can be constructed and classifications of the best practice loss mitigation technology for a given insurable interest may be determined. Pattern recognition systems, such as utilized in the form of neural networks, provide for a large theoretical basis for these types of systems. In general see, Principles of Expert Systems edited by A. Gupta et al., and published by IEEE Press (1988). By employing an expert system an individual has the benefit of a system that can provide qualitative, nontrivial and high quality solutions and answers to outcomes that depend on complex arrays or quantities of data. See also, U.S. Pat. No. 5,023,785, R. F. Adrion et. al. entitled Hematological-Diagnoses Apparatus Employing Expert System Technology, which describes a system within the class of expert systems that may be adapted to deal with complex arrays or quantities of data as may be required in some applications of this invention. These systems can benefit the analysis of data collection, analysis, and diagnosis in complex insurance industry applications, especially when dealing across entire spectrums of loss mitigation classifications.

A classifier for improving methods of insurance underwriting, which includes a processor having one or more inputs to receive data structures representing a first unmitigated insurance underwriting risk pertaining to an identified building structure and a second mollified insurance underwriting risk on the assumption a certain technology will be employed in the building structure. The difference between these two data represents the incorporation of a technology that aides in the reduction of casualty property losses (either through reduction of claim incidence or absolute claim costs). Each data structure forms a logical association that may represent a logical, qualitative, comparative or quantitative evaluation (collectively hereinafter referred to as a "difference") which difference may be assigned a weight referred to as a weighted difference, between the first field representing an unmitigated risk, and the second field representing a mollified risk. The plurality of data structures generate weighted differences to form a plurality of weighted outputs. At least one of the weighted output signals represents a class for the unmitigated risk/mollified risk, and the datum represents an input into a process that sums the weighted differences to generate a minimized risk for a building structure under consideration. Essentially, the processor utilizes the weighted differences to form a logical association that may represent a logical, qualitative, comparative or quantitative evaluation (collectively hereinafter referred to as a "sum") wherein the weighted sum of one or more inputs represents levels of risk, with and without the technology to reduce the risk. By way of example, two (2) inputs, and one output might be the simple output from two risk levels, one with and one without the mitigating technology. The output is therefore: $W_0*t_0+W_1*t_1+K \cdot_b > 0$ for a risk having two different technologies incorporated into a hypothetical building structure and having a constant K resulting from non technology related losses.

Alternatively, a classifier for purposes of assigning combination of technologies existing in a building structure utilizes a decision tree. In this manner data structures representing the quantification of risk reduction attendant a given technology or product can be chained into a plurality of decision trees. In one aspect of the invention the decision tree provides for the creation of a decision tree that includes a construction phase and a pruning phase. The construction phase requires that the set of building structures and corresponding combination of technologies be recursively partitioned into two or more subpartitions until a stopping criterion is met, and a classification assigned. The decision applies a splitting criterion to every node of the tree. These splitting criterion are determined by applying a predetermined rule or function that an underwriter applies to eventually place the applicant for insurance into a classification that is then utilized as a factor in establishing the premium.

Each node may utilize any number of conventionally available analytical techniques for producing a splitting criterion. For example, each branch may be programmed to produce a weighted average ($W_{1-N}$) that may subsequently be applied in successive nodes and branches to influence the final risk classification.

In one aspect of the invention, the processor is programmed to impose a decision criterion based upon whether a set of technologies exist in a particular type of building structure. The partitioning eventually leads to specific types of coverages at specific premium levels, effectively pruning those "risk branches" that were amenable to insurance coverage under any set of underwriting parameters from those "risk branches" for which, risk reduction mechanisms other than insurance are indicated. An alternate embodiment would incorporate a continuous function for the limit on W, values of which would selectively result in specific underwriting choices, exclusions or excess premium charges.

The invention herein also discloses a method for managing the underwriting, quoting and binding of a property and casualty insurance policy for an insured with regard to the technology used to militate against certain insurance property losses. More particularly, the method of underwriting insurance takes into account technologies that militate against loss the method comprising the steps of: identifying a technology that improves a claim risk associated with a property loss against which an insured purchases insurance; advising the insured to obtain the technology as a condition of obtaining insurance on the property as well as advising the insured of the insurance consequences of using specific technologies, which allows the insured to perform a cost/benefit analysis; and providing an insurance policy that accounts for the diminution of risk, or incorporates appropriate waivers, exclusions or riders, following incorporation of the technology. Such method may be practiced in conjunction with the evaluation and underwriting of a specific insurable interest or by presentation of the plurality of technologies having the greatest influence on the underwriting criteria and premium calculation in such a manner as to allow objective analysis of inclusion of a specific technology (cost) against availability of risk insurance as a reduced premium over the life of the technology (benefit). The methods of assessing the best practice loss mitigation technology also may benefit architects and builders of structures who would gain design insights into best practices in the construction of buildings. Such intended effects would have both safety and economic benefits upon the incorporation of specific technologies.

A method for underwriting insurance takes into account technologies that militate against loss through methodologies comprising the steps of: maintaining a database identifying a plurality of technologies that reduce risk of loss suitable for an associated building structure; maintaining a database of risk mitigation associated with technologies and the associated building structures; identifying a building structure comparable to the associated building structure, that requires insurance; calculating the risk associated with the building structure that requires insurance; and accounting for the risk reduction resulting from incorporation of at least one technology into the building structure requiring insurance; a means for the creation of a policy having exclusions appropriate for the structure and the incorporated risk reduction technologies; and controlling a printing device to print a complete insurance policy based on the subject building.

The invention herein includes an information processing system for underwriting a potentially insurable risk, comprising: means providing first and second data bases, a terminal device; a means for storing information relating to the potentially insurable risk in the first data base; a means for storing information relating to the potentially insurable risk mitigated by a technology in the second data base; a means for evaluating the information stored in the first data and second data base and for identifying additional elements of information required for evaluating the potentially insurable risk, and for requesting entry of said additional information for subsequent storage in the first data base; a means for assigning a weight to at least one of the selected elements of information from the first data base on the basis of predetermined relationships existing between the elements of information in the first data base and corresponding elements of information in the second data base; means for associating selected elements of information from the first data base with corresponding elements of information previously stored in the second data base; means for displaying information corresponding to at least one of the selected elements of information from the associating selected elements of information; and means for determining at least one risk classification for the potentially insurable risk from the weights assigned to the elements of information in the first data base.

The information processing system for underwriting further comprises: a plurality of terminal means to manage insurance accounts; a database processor means for storing predetermined data, said database processor means being interconnected and responsive to each of said plurality of terminal means; a processor means for managing the predetermined data, said file processor means being interconnected and responsive to each of said plurality of terminal means; an output means for producing documents in at least one of text, graphics, and electronic transfer mode, said output means being interconnected and responsive to each of said plurality of terminal means; and, an input means for receiving predetermined input data into said information processing system, said input means being interconnected and responsive to each of said plurality of terminal means; and, software means for configuring each of said plurality of terminal means, database processor means, file processor means, output means, and input means for, managing said technology insurance underwriting quoting, policy generation and binding of insurance policies. The system for managing insurance accordingly may also be adapted to output a specification of best practices to mitigate losses based upon the use of selected technologies in the construction utilization within a subject building.

The invention herein also discloses a preferred embodiment for determining the classification of risk and consequent premium for a structure that utilizes an array of available technologies. The combinations for such technology driven structures is characteristically large and the invention herein utilizes a neural network to determine the optimum risk loss and premium. The neural network comprises an input layer, an output layer, and at least one hidden layer, operable to produce outputs from said output layer when inputs are supplied to the input layer of said neural network, said artificial neural network having been previously trained in accordance with training exemplars of loss mitigation due to the incorporation of certain technologies establishing a particular knowledge domain therein. Such embodiment may have a resultant product that informs the production of a specific policy of insurance or may have a resultant product that quantitatively presents the economic effects (insurability or reduction in premium) associated with one or more technologies based upon a variable (or generic) insurable risk profile (an abstract, rather than a specific insurable risk).

The methodology at arriving at the optimum premium comprises a method for performing risk analysis utilizing a neural network performing the steps of: collecting data on an efficacy of a first combination of technologies; applying the data to an input layer of the network; training the network by optimizing the weighted connections of the network to an underwriting criteria that decreases the risk of an insurable interest such that weights are determined; applying a second combination of technologies to an input layer of the network classifying the second combination of technologies into ordinal values and categorical values; such that the classification represents an optimized premium estimation.

The invention herein also discloses a preferred embodiment for determining the classification of risk and consequent premium for a structure that utilizes an array of available technologies that are actively monitored for functionality. By way of example, in the simplest form such active monitoring may be a single or periodic physical inspection of the technologies as self-reported by the potential insured, by a representative of the insurance underwriter, or third party technician with credentials acceptable to the insurance underwriter to confirm installation and/or proper function. However, the invention encompasses more sophisticated real-time polling of the technologies for "current status" functionality, with the resultant polling report being an active input into the input layer of the neural net (allowing adjustment of insurability status and premium calculation based upon the actual, as opposed to hypothetical, functionality of the technologies). The invention also encompasses positive prevention attributes of technologies, as well as simple monitoring, such that a specific technology may not only provide an alert of a dangerous condition, but also take immediate remedial actions to militate such condition with both the alert and remedial action being subject to real-time polling, such polling being active inputs into the input layer of the neural net.

BRIEF DESCRIPTION OF THE DRAWING

FIG. 1 shows a block diagram of a generalized computer system suitable for use in practicing the present invention.

FIG. 3a shows a schematic of the process for classifying risk input data on the assumption a certain technology will be employed in the present invention.

FIG. 3b shows a schematic of the process for classifying risk input data on the assumption a certain technology will be employed in the present invention.

FIG. 4 is a classifier that assists in carrying out the method of adjusting premium based on mitigation technologies.

DESCRIPTION OF THE INVENTION

Figure 2A:
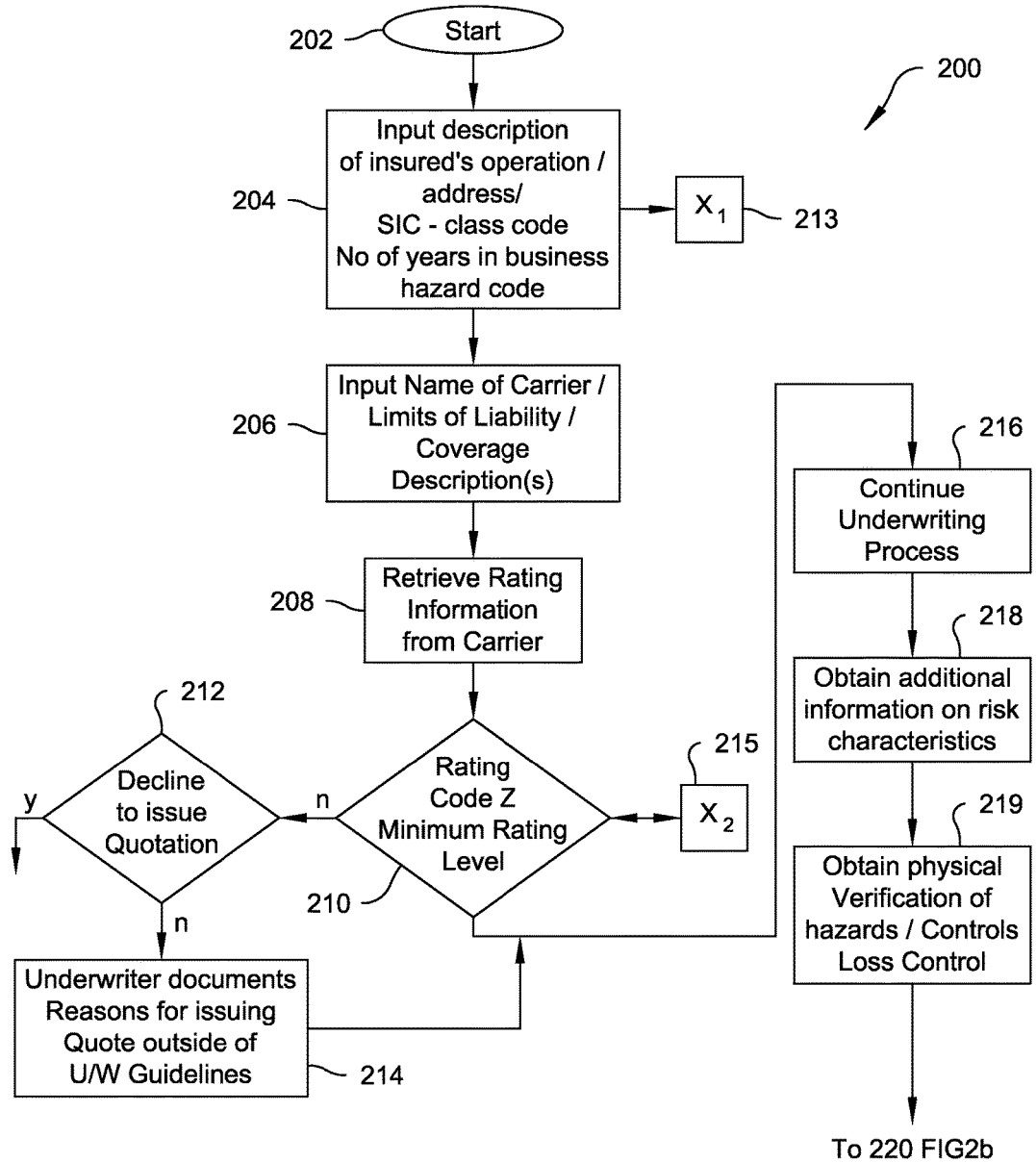
FIG. 2a and FIG. 2b show a block diagram of the logical organization of the methodology used in the invention as it relates to underwriting, quoting, and binding an insurance policy.

Referring to FIG. 1, the invention disclosed herein is a system for underwriting, quoting, policy generation and binding an insurance policy with regard to the technology being employed to militate against the financial consequences of certain property and casualty losses. It will be understood that FIG. 1, illustrates an exemplary embodiment of a system 100 that may be used for implementing the principles of the present invention. In general, the system includes a local area network of terminals or workstations, database file servers, input devices and output devices configured by software for accumulating, processing, administering and analyzing insurance in an automated workflow environment. The system provides, for on-line quoting, rating, and binding of insurance policies, electronic data transfer and the evaluation and access to the data relevant to technology pertinent to reducing costs associated with certain avoidable hazards and losses. The system also provides for publication of the quantitative effects of a single or a plurality of technologies upon the underwriting process based upon-generic inquiries specifying a range of variables related to technologies incorporated into the data stored on the database file servers.

System 100 includes one or more terminals 110a-110n, each having a corresponding CPU, such as CPU 106 which includes a display 103 and memory 104. The terminals 110a-110n are used for underwriting, creating, selling and managing insurance policies, the issuance and premium of which is based upon the technology utilized in connection with the insurable interest. In addition, a database means 150 is interconnected to the terminals 110a-110n for storing predetermined rate data; output means 160 for producing documents in at least one of text, graphics, and electronic transfer mode, said output means being interconnected and responsive to each of said plurality of terminal means such as terminal means 110n; and, a corresponding input means 108 for receiving predetermined input into said CPU 106, and a software means (unshown) for configuring each of said plurality of terminals 110a-110n.

Output means 160 represents one or more devices, such as other facsimile machines, photocopiers, etc., that have access to rate filings, which may be stored on database 150. Input source 115 also communicates with one or more network connections for receiving data from a server 140 over network 120, e.g., a global computer communications network such as the Internet, a wide area network, a metropolitan area network, a local area network, a terrestrial broadcast system, a cable network, a satellite network, a wireless network, or a telephone network, as well as portions or combinations of these and other types of networks.

Other servers 140 may be in communication with network 120 or may be in direct communication with terminals 110a-110n. Server 140 and terminals 110a-110n are in communication with database means 170 to obtain rate information, to store information related to hazard ratings and for any suitable purpose in underwriting, creating, selling and managing insurance policies, the issuance and premium of which, is based upon the technology utilized in connection with the insurable interest or the publication of the quantitative effects a single or a plurality of technologies have upon the underwriting process, and based upon generic inquiries specifying a range of variables related to the technologies incorporated into the data stored on the database means 170.

In addition to on-site databases, such as database means 150 and a remote data base means 170, data may be provided from a data provider 180.

Figure 2B:
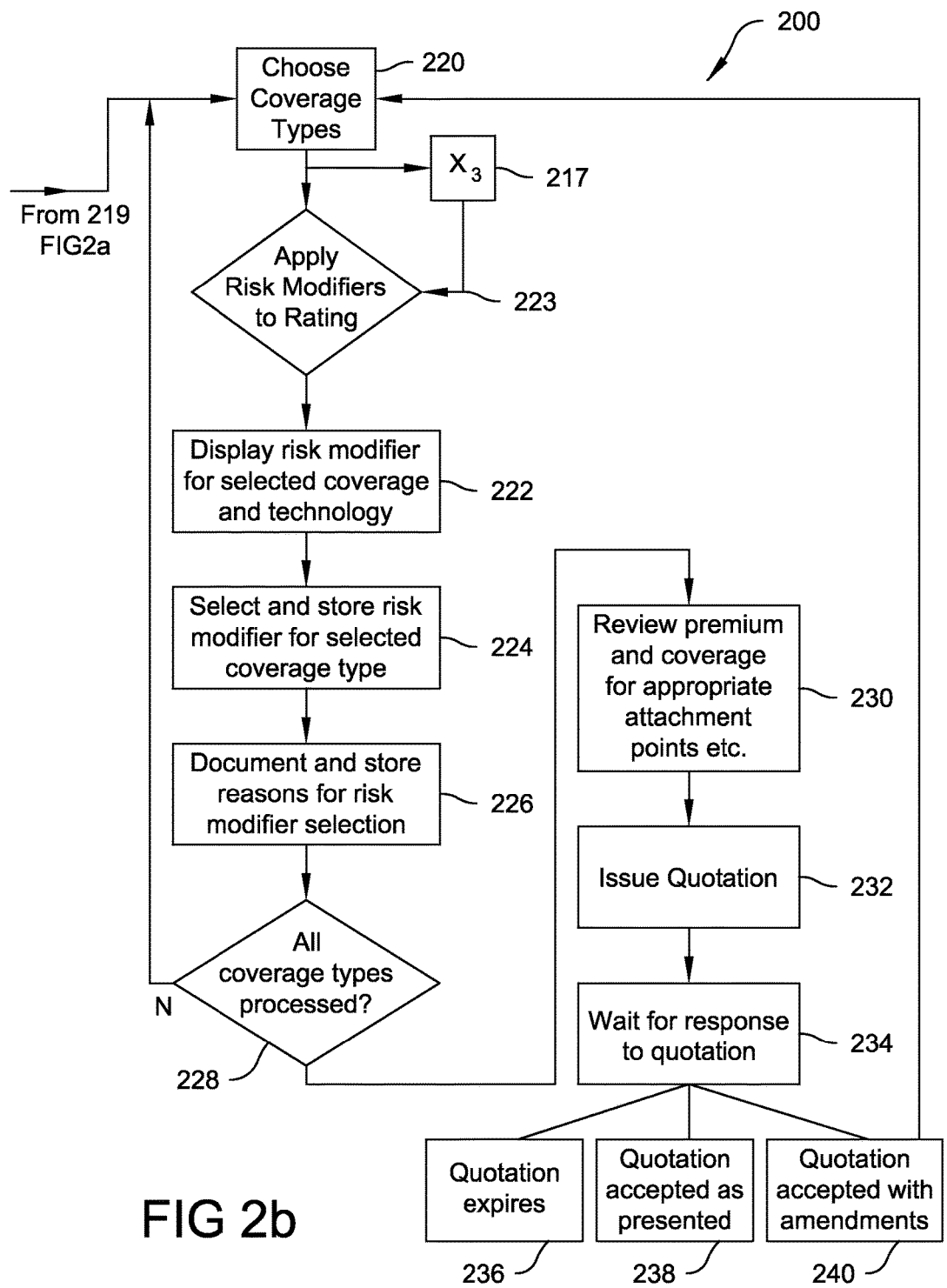

In a preferred embodiment, computer readable code executed by CPU 106 as processing relates to terminals 110n may implement the coding and decoding employing the principles of the present invention. Correspondingly, computer readable code executed by server 140 as processing relates to CPU 145 may implement coding and decoding employing the principles of the present invention. In other embodiments, hardware circuitry may be used in place of, or in combination with, software instructions to implement the invention. For example, the elements illustrated herein may also be implemented as discrete hardware elements. As would be appreciated, terminals 110a-110n and server 140 may be embodied in such means as a general purpose or special purpose computing system, or may be a hardware configuration, such as a dedicated logic circuit, integrated circuit, Programmable Array Logic (PAL), Application Specific Integrated Circuit (ASIC), that provides known outputs in response to known inputs. Referring to FIG. 2a and FIG. 2b, a flow chart illustrates the operation of a computer-implemented software process 200 for underwriting, quoting, binding, issuing and managing insurance policies, by an insurance carrier underwriter of a casualty insurance policy dependent upon the technology existing within the insurable interest, in accordance with a preferred embodiment of the present invention. Software process 200 is preferably implemented on a workstation typical of the terminal 110a-110n such as illustrated in FIG. 1. In the present instance, the System 100 allows users to access process 200 to perform underwriting functions; quote policy coverages and premiums for insurance policies locally and from remote locations.

Although the following description will refer to a system for the generation of a commercial property and casualty lines of insurance for building structures, an equivalent process is applicable to any insurable interests where the underwriting criteria and the premium are influenced by the absence or presence of technology. Such insurable interests are by way of example only, residential premises, vehicles, marine craft and aircraft. In referring to FIG. 1 and FIG. 2a, FIG. 2b in a first step 202, through an input device 108, a user logs into process 200 through an associated terminal 110n having a display 103, that connects to a means 150, providing first and second data bases. In the next step 204, utilizing the input device 108, the user enters quotation information pertaining to the insured party for whom casualty insurance dependent upon the technology is to be underwritten. Such information typically includes, the name, address, telephone number of the insured party, the date the request for the quotation was received, a description of the insured's operation and the standard industrial codes ("SIC"), which are associated with the insured's business.

The System 100 and associated software process 200 maintains several means for storing databases such as means 150 and means 170. As will be apparent to those skilled in the art of programming the specific storage of databases utilized by the system 100 will present a design choice for the programmer. The description that follows may call out a database means attached to a user terminal such as 110n, but such database means as means 170 attached to server 140 would also fall within the spirit of the inventions, in any instance where a database means were required.

A plurality of SIC records are stored in a database resident in a database means 150. Each of the SIC records are linked to underwriting guidelines (unshown) established and filed by the insurance carrier. These criteria include guidelines related to minimum premiums, hazard rating, underwriting authority, and referral criteria.

The process 200 displays on display 103 a plurality of candidate risk modifiers, such as may be retrieved at points in the process as by way of example risk modifier 213, 215 or 217, each associated with one or more technologies that mitigate the risk of loss or hazards associated with the insurable business property. Step 204 records a selected risk modifier code 213 and related underwriting criteria associated with the business property and associated policy.

The process 200 proceeds to step 206, where the user enters into the process 200 the name of the carrier, and the coverage type and coverage limits of the insurance policy. Since the underlying insurance policy may have separate limits for general liability and specifically named liability coverages, the insurance policy producer may enter separate primary coverage limits for general liability and specific liability coverages in this step. In step 206, the insurance policy producer enters the expiration dates of the proposed insurance contract and a description of the insured property.

In step 208, the process 200 retrieves from a first database resident in database means 150, public bureau rating information. The present invention maintains in database 150 information relating to the potentially insurable risk, mitigated by a technology. In step 210, the rating quoted is compared against a predetermined minimum technology-rating threshold 210 established by the carrier issuing the insurance offer quotation. The process 200 takes into account the risk modification step 215, where a risk modifier code factors into the decision, the effects of mitigation of risk through the use of technology. If, as a result of this comparison, the system determines that the rating of the insurance carrier is below the predetermined threshold, the system proceeds to step 212, where the insurance underwriter is given the option to decline to issue a quotation or refer the submission to a managing authority for further consideration. If the user declines to issue the quotation in step 212, then the system optionally generates a declination letter, indicating that no quote will be submitted for the casualty policy dependent upon technology; otherwise, the system proceeds to step 214 where the user is typically required to document reasons for writing coverage that does not meet minimum underwriting criteria.

In step 216, the system retrieves and displays underwriting guidelines associated with the SIC that were previously entered in step 204. The present invention maintains a database residing on database means 150, which contains underwriting instructions and guidelines, including minimum premiums, loss or hazard mitigation technology and hazard rating instructions, corresponding to each SIC that a user might enter into the system in step 204.

The loss or hazard mitigation technology and hazard rating instructions contain factors that are considered when associating a risk to a particular SIC. Based on this loss or hazard mitigation technology and hazard rating information, the user selects one or more ratings for the quotation in step 218. The selected loss or hazard mitigation technology and hazard rating(s) are then stored in the process 200 database means 150 as part of the computer file associated with the particular quotation. In step 219, the user may obtain a physical verification of the use of certain risk mitigation technology for the insurable interest under consideration.

In step 220, the user chooses one or more of the coverage types which are applicable to the casualty insurance policy, dependent upon the specific mitigation technology being considered in the quote. Thus, for example, if the policy being quoted includes coverage for premises/operations liability, the system would display 222 a range of risk modifiers 223 for the selected coverage. A risk modifier 223 is used to indicate where the specific risk falls in relation to a base or average risk for a given classification. In the present invention, the base risk has two components, a first specific risk, historically associated with a structure, and a second specific risk that mollifies the first risk dependent on the technology utilized. The risk modifier 223 is the result of the classification 217 of the various technologies that are applicable to the building structure under consideration. The loss control programs and technology that the insured institutes, essentially influences the magnitude of the risk modifier. In steps 224 the user selects one of the predetermined risk modifiers for the selected coverage, and then documents 226 the reasons (e.g., loss mitigation technology or loss control programs) for the specific risk modifier that the user selected. In step 228, the process may be repeated for each type of coverage dependent upon number or different technologies to be included as part of the quotation.

In step 230, the system generates casualty insurance premium amounts corresponding to a plurality of different insurance attachment points. For each attachment point, the corresponding premium amount generated by the system is based on, among other things, a minimum premium amount associated with the SIC input in step 204, the hazard rating code(s) selected in step 218, and the two risk modifier code(s) selected in steps 223 and 224, respectively. In a preferred embodiment, the premium amounts are generated in step 230 from a table stored on the process 200 database 150.

Next, in step 232, the user selects one or more of the attachment points generated in step 230 for quotation, and the system then generates a quotation describing the policy being quoted and stating a premium for the policy. The quotation is then communicated to the insured.

After the quotation is issued in step 232, the system awaits 234 a response to the quotation. In the event that the quotation is accepted, the system proceeds to step 238 where the policy is thereafter bound. In the event a quotation 232 is not received in a time specified in the quotation, the offer expires 236. The quotation may also be accepted with proposed amendment 240, which is there upon resubmitted via step 220 to re-quote the premium.

The method herein includes the automation of the collection of technology strategies based in part on an automated decision support tool, for objective evaluation of data relating to any collection related to decisions or activities, and a historical data warehouse, for comparison to all other non technology based insurance underwriting.

The methodology herein includes systems which may perform active polling and systems check utilizing communications systems such as the Internet, telephone or broadcast transmissions in combination with other forms of communications.

In FIG. 3a a classification device, such as neutral network, is trained to learn an unknown function based on known inputs and corresponding outputs. Once the neural network learns the unknown function, it is able to generate outputs for other sets of inputs. The invention classifies risk based upon comparing an insurable interest, without the benefit of a technological enhancement, against the same risk with a benefit of the technology have a risk reducing value. In a preferred embodiment, a processor having one or more inputs to receive data structures representing a first unmitigated insurance underwriting risk pertaining to an identified building structure and a second mollified insurance underwriting risk on the assumption a certain technology will be employed. The second mollified insurance underwriting risk data represents the incorporation of a technology that aides in the reduction of the financial consequences of property loss. In one embodiment, each data structure typically forms a difference, referred to as a weighted difference, between the first data field representing an unmitigated risk, and the second data field representing a mollified risk. The plurality of data structures generate weighted differences to form a plurality of weighted outputs. At least one of the weighted outputs represent a class for the mollified risk, and the datum represents an input into a process that sums all the weighted differences to generates a minimized risk for an insurable interest under consideration. Such minimization processes are well-known in the art of neural network design engineering. Essentially, the processor calculates the weighted sum of one or more inputs representing levels of risk, with and without the technology to reduce the risk.

By way of example, referring to FIG. 3a having two (2) inputs $t_0$ 303 and $t_1$ 304, and one output 305, represents the simple output from two risk levels, one with and one without the mitigating technology. The output is therefore: $W_0*t_0 + W_1*t_1 + K_b > 0$ for a risk having two different technologies, $t_{10}$ and $t_2$ incorporated into a hypothetical insurable interest such as a building structure and having a constant $K_b$ resulting from non technology related losses.

In a preferred embodiment, FIG. 3a illustrates a neural network classifier for categorizing and weighing risk data, for identified technology used in a building. The classifier employs modeling algorithms executed to generate data indicative of the predictive risk.

The classifier categorizes and weighs risk data representing for first unmitigated insurance risk 304 and a second mollified insurance risk 303 based upon the use of certain technology. Inputs 303 and 304 are multiplied by a pre assigned weights, 308 and 309 respectively. At the summing junction 307, the data forms a difference, referred to as a weighted difference, between the unmitigated risk 304 and the mollified risk 303. A plurality of such weighted differences are summed in a processor 302 having a sigmoid transfer function such that when the output 305 is back propagated at 306, the weighted difference generates a minimized risk for a building structure under consideration. Essentially, a processor operates to calculate the weighted sum of one or more inputs representing levels of risk, with and without the technology to reduce the risk. By way of example, consider the two (2) inputs 303 and 304 generating output 305 which data represents the summation: $W_0*t_0+W_1*t_1+K_b>0$ for a risk having two different technologies, $t_1$ and $t_2$ incorporated into a hypothetical building structure and having a constant K resulting from a non technology related loss.

In order to adjust the premium base on mitigation technology, such as required, for example, in step 223, FIG. 2, a preferred method of classification as illustrated by the schematic in FIG. 3b. The classification method comprises the steps of generating a plurality of technology mitigation variables, wherein each of the technology mitigation variables corresponds to an underwriting classification commonly utilized to underwrite an insurance policy. The classifier generates a plurality of actual loss data from building structures that do not contain the mitigation technology, wherein each of the actual loss data is indicative of the actual loss of a plurality of policyholders. The classifier further: (1) generates a plurality of premiums, wherein each premium in the plurality of premiums is indicative of the premium charged to one of a plurality of policyholders; (2) generates a plurality of actual technology mitigation loss ratio data, wherein each of the actual loss ratio data is indicative of the actual loss ratio of one of the plurality of policyholders; (3) generates depending upon the plurality of underwriting classification plan variable values and upon said actual loss ratio data, a plurality of predicted loss ratio data, wherein the predicted loss ratio data, is indicative of a predicted loss ratio of one of the plurality of policy holders; and (4) generates, depending upon said plurality of underwriting classification value data, said actual loss ratio data and said predicted loss ratio data, which are indicative of a difference between the predicted loss ratio and the actual loss ratio of one of the plurality of policyholders.

FIG. 3b shows a neural network 300 used as an apparatus to classify multiple technologies that support the mitigation of loss consequent to the employment of technology. As well known in the art, computational processing units, such as 310a through 310n and 330, are grouped into layers, wherein the output signals from primary layers form input signals in secondary layers. The neural network 300 inputs 312a and 312n, have a one-to-one correspondence with technology mitigation data. Inputs 314a and 314n have a one-to-one correspondence with underwriting data that does not include technology mitigation data. These sets of data form the input layer for processing units 310a through processing unit 310n, respectively. Processor 310a, receives input data 312a and 314a and generates output data 316a representing a computation performed in accordance with a transfer function, such as a summation function, programmed or designed into the nonlinear element of the processor 318a-318n. A connection from a first processing unit 310a output 316sa is combined with a comparable one or more of a multiplicity of processing units, such as by way of example 310n having an output 316n, which forms input data to a third processing unit 330. Optionally output 317 can be feedback or back propagated into the processing units 310a-310n via switch 317.

In an alternate embodiment of the invention herein, FIG. 4 is a classifier 400 that assists in carrying out the foregoing method, and assists in the performance of the step 213, 215, and 217, FIG. 2, to predict loss based on the mitigation of a technology and thereby determine a requisite premium.

In the overview, a database of vectors 403 representing combinations of technologies used in a construction of a building are assigned magnitudes representative of their efficiency to create a favorable loss experience as loss relates to one or more insurable occurrences. Each vector in the database 403 is utilized in a neural network as a training set. The training set calculates a set of weights that when utilized with other actual proposed constructions an a posteriori vector representing a potentially insurable interest yields an approximate loss ratio.

The technology classifier contains a set of technology mitigation vectors in database 402 as combination variables, each specific to one building configuration. Essentially, the vectors represent attributes of a plurality of technologies that reduce potential property loss. The technology mitigation vectors each contain a plurality of values. Note, that each of the technologies extant in database 402, 403 may be stored on databases, such as 150 or 170, (FIG. 1). The vectors have an assigned premium or loss premium coefficient related to a loss ratio mitigation factor.

The network 401 utilizes inputs 405, which have a one-to-one correspondence with classification of mitigation technology values, to form an input layer 410, which has as its input mitigation of technology data stored in database 402 via line 415. Similarly, the classifier has an output 425, which generates data indicative of a predicted loss ratio. A single hidden layer 435 of neurons 440 couples input layer 410 to output layer 425.

Line 430b serves to adjust the weights in accordance with the weight adjustment data resident vectors in database 403. The controller 465 generates weight adjustment data on line 470, to establish the optimum weights in the layers 410 and 435. Technology mitigation data, which the controller 465 receives, are presented as inputs to the network 401 via line 415 during what is commonly referred to as the training mode for the neural network. The controller 465 receives the output signals of the network 401 on line 430b and compares them with the data indicative of the actual loss ratio received on a line 460. The actual loss, weight adjustment data is stored as a series of vectors, database 403 and form the input 460 to controller 465. Controller 465 adjusts the weights during the training process until the difference between the output signal on line 430b and the desired output signal on line 460 is reduced to a desired minimum.

When a input 450 received from database 451, representing a technology configuration of a possible insurable, it is passed to the controller 465 and then passed on to the neural network 401 whereby, the loss ratio is determined at 420, based upon the weights as previously trained during the training mode.

Figure 5:
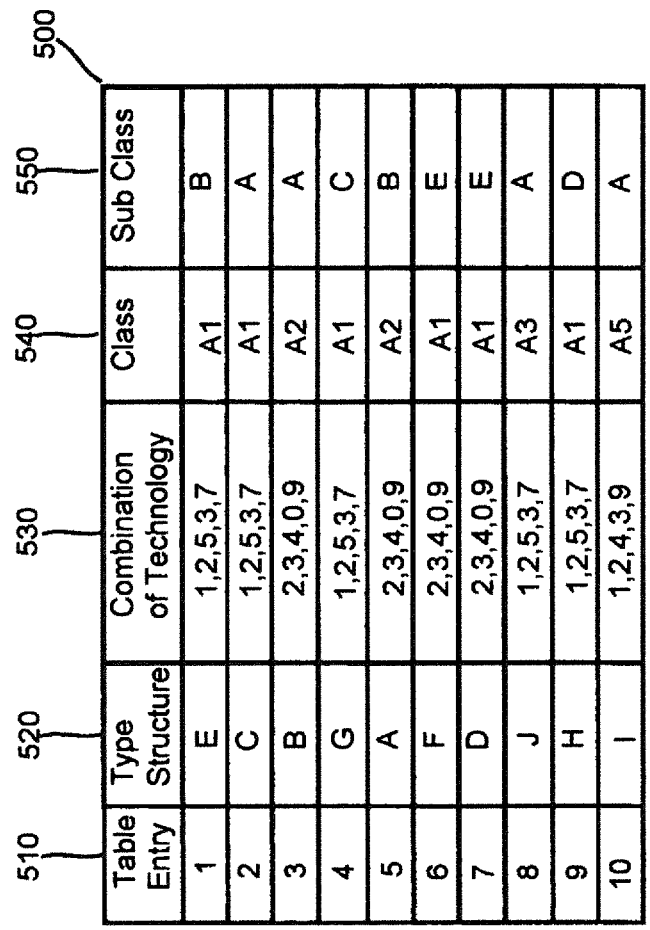
FIG. 5 shows a table of building types and technological combinations.
Figure 6:
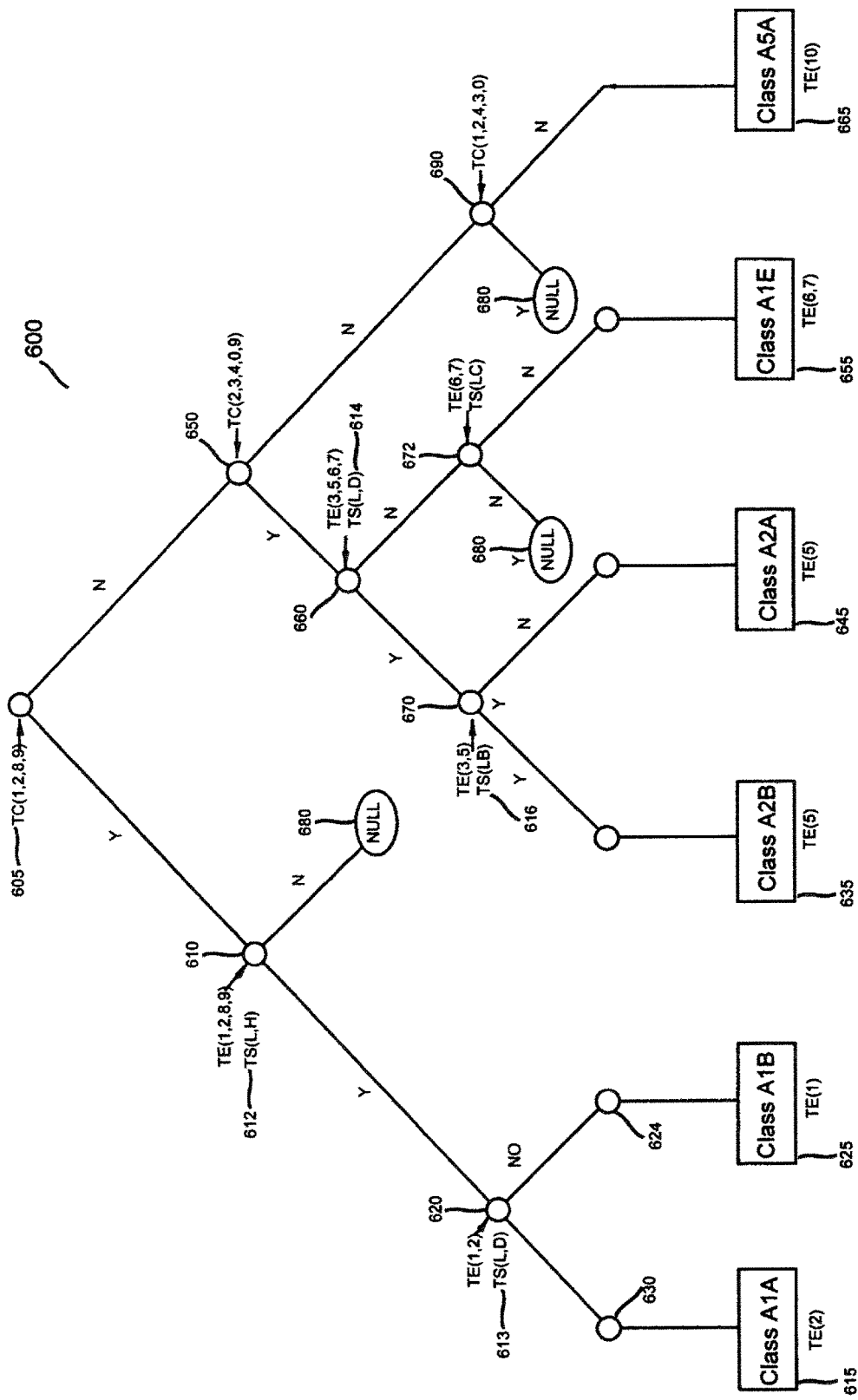
FIG. 6 is a decision tree classifier to carry out the method of adjusting premium based on mitigation technologies.

In FIG. 5 a table 500 and FIG. 6 a decision tree classifier 600 are utilized to assign combinations of technologies, employed in existing building structures to a classification, which then permits an underwriter to establish a premium. In this manner data structures representing the quantification of risk reduction attendant a given technology or product can be chained into a plurality of decision trees. In one aspect of the invention the decision tree 600 includes a construction phase and a pruning phase. The construction phase requires that the set of building structures and corresponding combination of technologies be recursively partitioned into two or more subpartitions, until a stopping criterion is met and a classification assigned. The decision applies a splitting criterion to every node of the tree. These splitting criteria are determined by applying a predetermined rule or function that an underwriter applies to eventually place the applicant for insurance into a classification that is then utilized as a factor in establishing the premium.

Each node may utilize any number of conventionally available analytical techniques for producing a splitting criterion. For example, each branch may be programmed to produce a weighted average ($W_{1-N}$) that may subsequently be applied in successive nodes and branches to influence the final risk classification. On the other hand, the decision criterion might be a simple binary decision, where an attribute either exists or does not exist in the data set.

In one aspect of the invention, a processor (unshown) is programmed to impose a decision criterion based upon whether a set of technologies exist in a particular type of building structure. As such the invention is also a method for classifying risk reduction technology comprising the steps of: storing data representing a training set in a memory, the data including a multiplicity of entries each having a plurality of attributes, such as type of construction, combinations of technologies and other relevant factors; and classifying the training set by building a decision tree based on the attributes of the training set entries. Thereafter, a method employed in classifying an underwriting risk utilizes the decision tree based on the attributes of the training set. FIG. 5, table 500 tabulates hypothetical table entries 510 of building structures, each of which are representative of a structure type 520. A structure type 520 may, by way of example, be a wood frame construction and in another instance be a masonry construction. Each of the differing type structures may include combination of technology 530 indicative of risk reducing technologies. When the type structure 520 is utilized in combination with a combination of technology 530, a class 540 and optionally a subclass 550 are assigned. Subsequently, actual type structures having the identical combination of technology will be classified in accordance with the representative table 500 as falling within one of the class 540 and subclass 550. The foregoing table 500 may be utilized as data for any number of expert system analysis. For example, in an alternate embodiment the data contained in table 500 would be utilized as input to a multivariate statistical analysis or to create a continuous function that would lead to values that selectively result in specific underwriting choices, exclusions or excess premium charges.

In FIG. 6, the partitioning begins at node 605 where the combination of technology 530 containing technologies 1, 2, 5, 3, 7 abbreviated TC (1, 2, 5, 3, 7) from Table 500, leads to a bifurcation. A "yes" indicating that such a combination exists in the table entry 510, leads to node 610. A "no", indicating that such a combination does not exists in the table entry 510, leads to node 650. At node 610, the table entry 510 that meet the criteria established at node 620 are listed and they are subjected to a second set of criteria, as for example, whether the type structure 520 falls below an ordering criteria 612 established by yet another criteria, which for purposes of this description may be, a function of organizing type structures 520 on the basis of imperviousness to hurricanes, fire or other catastrophic events. In the present example, structures falling below the letter designation "H" will lead to node 620. At node 620 ordering criteria 613 classifies TE(1,2) into two classes at node 624 and node 630, respectively. A classification of TE(2) is established at node 615 designated as Class A1A. In a like manner, a "no" decision at node 620, leads to node 624 and a classification of A1B for TE(1). At node 650, TC(2,3,4,0,9) is subjected to whether the combination of technologies include TC(2,3,4, 0,9). If they do, then those table entries are culled out for examination at node 660. At node 660 the table entry TE(3,5,6,7) are tested against whether the meet the criteria 614, falling before "D" in the type structure 520 column. If the criteria 614 is met, then a further node 670 tests each table entry 510 against a criteria 616 relating to the type structure being less than "B" in the table 500. Other branches designated by node 560 may produce corresponding direction changes based upon a test TS (L, D) 214 leads to node 672. A test TS (L, C) leads correspondingly to either the node 680 or a classification Class A, E 665. Finally at node 635 a class A2B is assigned to table entry TE(5). Similarly at node 690 a type construction TC(1,2,4,3,0) is simply tested against the existence of a table entry 510. If a table entry 510 does not exist then the node 665 assigns a class A5A to the table entry or entries as may be the case. Various null paths such as null 680, may be further assigned underwriting significance as the particular case may require. The various paths that the decision tree follows in any particular instance represents a pruning of those "risk branches" that were amenable to insurance coverage due to risk reduction mechanisms being employed.

As will be apparent to those skilled in the art of computer software, the programming language, and where and on what computer the software is executed is a design choice. The foregoing description of decision tree 600 as configured is by way of illustration and example only and is not to be taken by way of limitation, the spirit and scope of the present invention being limited only by the terms of the appended claims.

A method of underwriting insurance by taking into account technologies that militate against loss may comprise the steps of: identifying a technology that mitigates a risk associated with a property loss for which an insured purchases insurance; and providing an insurance policy that accounts for the diminution of risk. In an embodiment, the method may further include the step of advising the prospective insured to obtain the technology. In an embodiment, the method may also include the further step of advising the prospective insured about the cost benefits of obtaining the technology. In an embodiment, the method may also include the further step of providing a specification of best practices to mitigate losses through the application of a technology.

A method for underwriting insurance by taking into account technologies that militate against loss may comprise the steps of: maintaining a database identifying a plurality of technologies that reduce risk of loss to an associated building structure; identifying a building structure comparable to the associated building structure, that requires insurance; calculating the risk of loss related to the building structure; and accounting for the risk reduction resulting from incorporation of at least one technology into the building structure; and creating an insurance policy for the structure based upon the incorporated risk reduction technology. In an embodiment the method may also include the further step of polling the insured interest to determine its compliance with incorporation of at least one technology into the building structure.

A system for underwriting insurance by taking into account technologies that militate against loss may comprise: a means for classifying risk input data, the means include a processor having one or more inputs to receive one or more data structures representing a first plurality of unmitigated underwriting risks pertaining to an identified building structure and a second plurality of mitigated underwriting risks based on the assumption one or more specified technologies will be employed in the building structure, a logical association between the first and second data structure representing the incorporation of a technology that aides in the reduction of a casualty property loss for the building under consideration for insurance wherein, each data structure combined forms a weighted difference between the first unmitigated risk and the second mitigated risk, and wherein a plurality of weighted differences represent an underwriting class for the unmitigated risk/mitigated risk combination to generate a minimized risk for a building structure under consideration.

A system for underwriting insurance by taking into account technologies that mitigate against loss may comprise: one or more decision trees, each branch of which produces a weight representing an underwriting risk specific to an insurance coverage and premium. In an embodiment of the system, a continuous function may be utilized to assign the weight to produce risk values representing underwriting choices, exclusions, and premium charges to an insurance policy for combinations of property and risk reduction technology. In an embodiment, the output means may be a device to print a specification of best practices for loss mitigation based on the subject building.

A computer system for evaluating the insurability of a potentially insurable risk, may comprise: a means providing first and second data bases; a means for storing information relating to the potentially insurable risk in the first data base; a means for storing information relating to the potentially insurable risk mitigated by a technology in the second data base; a means for evaluating the information stored in the first data and second data base and for identifying additional elements of information required for evaluating the potentially insurable risk, including: means for assigning a weight to at least one of the selected elements of information from the first data base on the basis of a relationship between the elements of information in the first data base and corresponding elements of information in the second data base; a means for associating the weights to calculate at least one risk classification for the potentially insurable risk from the weights assigned to the elements of information from the first data base; and a means for displaying at least one at least one risk classification. In an embodiment, the means for assigning a weight includes one or more expert systems.

A computer system for managing insurance based upon technology utilized in a structure may comprise: a plurality of workstation processor means for managing one or more insurance accounts; a database processor means for storing, at least one element of data which depicts technology that mitigates insurance risk, the database processor means being interconnected and responsive to each of the plurality of workstation processor means; a file processor means for managing at least one element of data which represents technology that mitigates insurance risk, the file processor means being interconnected and responsive to each of the plurality of workstation processor means; an output means for producing documents in at least one of text, graphics, and electronic transfer mode, the output means being interconnected and responsive to each of the plurality of the workstation processor means; and, an input means for receiving at least one input, of which represents technology that mitigates insurance risk, into the computer system, the input means being interconnected and responsive to each of the plurality of workstation processor means; and, a software means for configuring each of the plurality of workstation processor means, database processor means, file processor means, output means, and input means. In an embodiment of the system, the output means may be a device to print an insurance policy based on an insurable interest.

A method of underwriting insurance may comprise the steps of: maintaining a data base identifying risk mitigation technology and corresponding loss mitigation values; and scanning periodically an insurable interest to identify sensors and corresponding sensor data associated with risk mitigation technology; and comparing sensor data to the risk mitigation technology and corresponding loss mitigation values; and controlling a printing device to print an insurance policy.

A system for identifying matches between risk mitigation technology installed at an insurable interest and a risk mitigation technology listed in an insurance policy may comprise: a database storage means; a processor programmed to: maintain the database storage means wherein is identified installed risk mitigation technology; audit the insurable interest to identify sensors and corresponding sensor data associated with installed risk mitigation technology; and compare corresponding data to identified installed risk mitigation technology stored in the database storage means; and control a printing device to print a report on the operational status of the identified sensors.

A computer readable medium may have stored thereon one or more data structure selected from the group comprising of: a first field containing data representing an indication of the conformity to a prescribed level of risk due to the use of risk mitigation technology; and a second field containing data representing the address of an insurable interest associated with the first field data; and at least one field containing data representing a premium adjustment related to the utilization of the risk mitigation technology.

A neural network may comprise: an input layer, an output layer, and at least one hidden layer, operable to produce outputs from the output layer when inputs are supplied to the input layer of the neural network, the neural network having been previously trained in accordance with training exemplars of loss mitigation due to the incorporation of certain technologies.

A method for performing risk analysis utilizing a neural network may comprise the steps of: collecting data on a first combination of technologies; and applying the data to an input layer of the network; and training the network by optimizing weighted connections of the network to an underwriting criteria that decreases the risk of an insurable interest such that weights are determined; and applying a second combination of technologies to an input layer of the network; and classifying the second combination of technologies into ordinal values and categorical values, such that the classification represents a premium estimation.

A method for classifying risk reduction technology may comprise the steps of: storing data representing a training set in a memory, the data including a multiplicity of entries each having a plurality of attributes, such as a type of construction and a combinations of technologies; and building a decision tree based on the attributes of the training set entries thereby classifying the training set by. In an embodiment, the method may include a further step that includes classifying an underwriting risk using the decision tree based on the attributes of the training set.

Although the present invention has been described and illustrated in detail, it is clearly understood that the same is by way of illustration and example only and is not to be taken by way of limitation, the spirit and scope of the present invention being limited only by the terms of the appended claims.

The invention claimed is:

1. A system for processing data comprising:
   a storage device storing a database identifying a plurality of technologies that reduce risk of loss to an associated structure, wherein the structure comprises one of a commercial building, a residential building, a vehicle, a marine craft, and an aircraft;
   a computer processor in communication with the data storage device, configured to:
      perform real time polling of a plurality of sensor technologies incorporated in the structure;
      receive a monitoring data alert electronically output by at least one of the plurality of sensor technologies incorporated in the structure, the monitoring data alert indicative of a current risk relating to the structure;
      perform real time polling of remedial technology for taking remedial action to mitigate the current risk;
      receive remedial action monitoring data electronically output by the at least one of the incorporated sensor technologies responsive to the real time polling of the remedial technology for taking remedial action and indicative of whether a remedial action has been taken to mitigate the current risk;
      input, into a neural net trained on data structures indicative of an unmitigated factor pertaining to a structure and a mitigated factor based on incorporation of the technologies in the building structure, the monitoring data alert and the remedial action monitoring data, wherein the neural net comprises one of (a) a multilayer neural net including a neural net input layer having a plurality of computational processing units having a one-to-one correspondence to technology mitigation data; (b) a technology classifier having a set of technology mitigation vectors, each vector specific to one building configuration, and inputs having a one-to-one correspondence with classification of mitigation technology values, or (c) a decision tree classifier developed during a construction phase requiring that a set of building structures and corresponding combination of technologies by recursively partitioned into two or more subpartitions;
      determine, by the neural network, executed by the computer processor, an operational status of the sensor technologies and data indicative of whether the remedial action has been taken to mitigate the current risk; and
   a data storage device storing data indicative of terms of an insurance policy issued to an insured and covering the structure;
      wherein the computer processor is further configured to determine, based on the operational status of the sensor technologies and the insurance policy data in the database, whether an alteration in the data indicative of at least one of the terms of the insurance policy, after issue of the insurance policy, is warranted and, responsive to determination that an alteration in the data indicative of at least one of the terms of the insurance policy is warranted, alter data indicative of the at least one of the terms.

2. The system of claim 1, wherein the monitoring data alert comprises structure condition data and alert data concerning the current risk.

3. The system of claim 1, wherein the computer processor is further configured to poll the sensor technology for the monitoring data alert, thereby causing the sensor technology to send the monitoring data alert for the processor to receive.

4. The system of claim 1, wherein the insurance policy term alteration is a premium alteration.

5. The system of claim 1, wherein the operational status of the sensor technology comprises one or more of an operational status of a sensor for sensing the current risk to the structure, an operational status of an electronic data output for reporting the current risk to the structure, and an operational status of an automatic remediation system for deploying the remedial action to mitigate the current risk to the structure.

6. A computer-implemented method comprising:
   maintaining in a database stored in a storage device, data identifying a plurality of technologies that reduce risk of loss to an associated structure, wherein the structure comprises one of a commercial building, a residential building, a vehicle, a marine craft, and an aircraft;
   performing real time polling of a plurality of sensor technologies incorporated in the structure;
   receiving, by the at least one computer processor, a monitoring data alert electronically output by the sensor technologies incorporated in the structure, the monitoring data alert indicative of a current risk to the structure;
   performing, by the at least one computer processor, real time polling of remedial technology for taking remedial action to mitigate the current risk;
   responsive to the real time polling of remedial technology for taking remedial action, receiving, by the at least one computer processor, remedial action monitoring data electronically output by the incorporated sensor technologies indicative of whether a remedial action has been taken to mitigate the current risk;
   inputting into a neural net trained on data structures indicative of an unmitigated factor pertained to a structure and a mitigated factor based on incorporation of the technologies in the building structure, the monitoring data alert and the remedial action monitoring data, wherein the neural net comprises one of (a) a multilayer neural net including a neural net input layer having a plurality of computational processing units having a one-to-one correspondence to technology mitigation data; (b) a technology classifier having a set of technology mitigation vectors, each vector specific to one building configuration, and inputs having a one-to-one correspondence with classification of mitigation technology values, or (c) a decision tree classifier developed during a construction phase requiring that a set of building structures and corresponding combination of technologies by recursively partitioned into two or more subpartitions;
   determining, by the neural network, executed by the at least one computer processor, an operational status of the sensor technologies and data indicative of whether the remedial action has been taken to mitigate the current risk;

storing, in a data storage device, data indicative of terms of an insurance policy issued to an insured and covering the structure; and determining, based on the operational status of the sensor technologies, the data indicative of whether the remedial action has been taken to mitigate the current risk, and the insurance policy data, whether an alteration in the stored data indicative of one of the terms of the insurance policy is warranted and, responsive to a determination that an alteration in the data indicative of at least one of the terms of the insurance policy is warranted, altering data indicative of the at least one of the terms.

7. The method of claim 6, wherein the at least one computer processor is further configured to poll the sensor technology, thereby causing the sensor technology to send the monitoring data alert for the at least one computer processor to receive.

8. The method of claim 7, wherein the polled monitoring data alert comprises structure condition data and alert data concerning the current risk.

9. The method of claim 6, wherein the insurance policy term alteration is a loss of a reduction in premium reduction.

10. The method of claim 6, wherein the operational status of the sensor technology comprises one or more of an operational status of a sensor for sensing the current risk to the structure, an operational status of an electronic data output for reporting the current risk to the structure, and an operational status of an automatic remediation system for deploying the remedial action to mitigate the current risk.

11. A system comprising:
a data storage device storing a database identifying a plurality of technologies that reduce risk of loss to an associated structure, wherein the structure comprises one of a commercial building, a residential building, a vehicle, a marine craft, and an aircraft; and
at least one computer processor; and
computer executable instructions stored in a memory device for causing the at least one computer processor to:
update and store data relating to an insurance policy issued to an insured and covering the structure, wherein the structure incorporates a plurality of sensor technologies from the plurality of technologies identified in the database, provided by the insured;
perform real time polling of the sensor technologies incorporated in the structure;
receive a monitoring data alert electronically output by the sensor technologies incorporated in the structure, the monitoring data alert indicative of a current risk relating to the structure;
perform real time polling of remedial technology for taking remedial action to mitigate the current risk;
responsive to the polling, receive remedial action monitoring data electronically output by the incorporated sensor technologies indicative of whether a remedial action has been taken to mitigate the current risk;
input, into a neural network trained on data structures indicative of an unmitigated factor pertained to a structure and a mitigated factor based on incorporation of the technologies in the building structure, the monitoring data alert and the remedial action monitoring data, wherein the neural net comprises one of (a) a multilayer neural net including a neural network input layer having a plurality of computational processing units having a one-to-one correspondence to technology mitigation data; (b) a technology classifier having a set of technology mitigation vectors, each vector specific to one building configuration, and inputs having a one-to-one correspondence with classification of mitigation technology values, or (c) a decision tree classifier developed during a construction phase requiring that a set of building structures and corresponding combination of technologies by recursively partitioned into two or more subpartitions;
determine, by the neural network, executed by the at least one computer processor, an operational status of the sensor technologies and data indicative of whether the remedial action has been taken to mitigate the current risk; and
determine, based on the operational status of the sensor technologies, the data indicative of whether the remedial action has been taken to mitigate the current risk and the insurance policy data, whether an alteration in a premium term of the insurance policy, after issue of the insurance policy, is warranted.

12. The system of claim 11, wherein the remedial action monitoring data comprises data from a chemical remediation system for mitigating a mold risk to the structure.

13. The system of claim 11, wherein the remedial action monitoring data comprises data from a water pumping remediation system for mitigating a water risk to the structure.

14. The system of claim 11, wherein the remedial action monitoring data comprises data relating to a type of sprinkler system for mitigating a fire risk to the structure.

15. The system of claim 11, wherein the incorporated sensor technology comprises one of smoke detectors, fire detectors, intrusion systems, radiation detectors, chemical detectors, and biological hazard detectors.

16. The system of claim 11, wherein the incorporated sensor technology comprises one of water level detectors, water leakage detectors, vibration detectors, and meteorological condition detectors.

* * * * *